US005852116A

United States Patent [19]
Cree et al.

[11] Patent Number: 5,852,116
[45] Date of Patent: Dec. 22, 1998

[54] CROSSLINKABLE BIMODAL POLYOLEFIN COMPOSITIONS

[75] Inventors: Stephen H. Cree, Terneuzen, Netherlands; John Penfold, St. Gallen; Line F. Fanichet, Schwyz, both of Switzerland; Craig A. Wilson, Bois-Guillaume, France

[73] Assignee: The Dow Chemical Company, Midland, Mich.

[21] Appl. No.: 703,263

[22] Filed: Aug. 26, 1996

Related U.S. Application Data

[62] Division of Ser. No. 538,689, Oct. 3, 1995.

[51] Int. Cl.$^6$ .............................. C08L 23/26; C08L 51/06
[52] U.S. Cl. ............................................ 525/72; 525/193
[58] Field of Search ....................... 525/72, 193

[56] References Cited

U.S. PATENT DOCUMENTS

| | | | |
|---|---|---|---|
| 3,280,220 | 10/1966 | Nelson | 268/397 |
| 3,645,992 | 2/1972 | Elston et al. | 260/80.78 |
| 3,646,155 | 2/1972 | Scott | 260/827 |
| 3,914,342 | 10/1975 | Mitchell | 260/897 A |
| 4,302,565 | 11/1981 | Goeke et al. | 526/88 |
| 4,335,034 | 6/1982 | Zuckerman et al. | 524/423 |
| 4,339,507 | 7/1982 | Kurtz et al. | 428/522 |
| 4,403,007 | 9/1983 | Coughlin | 428/95 |
| 4,429,079 | 1/1984 | Shibata et al. | 525/240 |
| 4,438,238 | 3/1984 | Fukushima et al. | 525/240 |
| 4,461,873 | 7/1984 | Bailey et al. | 525/240 |
| 4,500,648 | 2/1985 | Malpass | 502/115 |
| 4,525,257 | 6/1985 | Kurtz et al. | 204/159 |
| 4,530,914 | 7/1985 | Ewen et al. | 502/113 |
| 4,542,886 | 9/1985 | Yoshimura et al. | 264/22 |
| 4,614,764 | 9/1986 | Columbo et al. | 525/193 |
| 4,701,432 | 10/1987 | Welborn, Jr. | 502/113 |
| 4,737,547 | 4/1988 | White | 525/282 |
| 4,786,697 | 11/1988 | Cozewith et al. | 526/88 |
| 4,798,081 | 1/1989 | Hazlitt et al. | 73/53 |
| 4,861,834 | 8/1989 | Audureau et al. | 525/194 |
| 4,874,820 | 10/1989 | Cozewith et al. | 525/240 |
| 4,937,299 | 6/1990 | Ewen et al. | 526/113 |
| 4,939,217 | 7/1990 | Stricklen | 526/114 |
| 5,089,321 | 2/1992 | Chum et al. | 428/218 |
| 5,189,106 | 2/1993 | Morimoto et al. | 525/240 |
| 5,210,142 | 5/1993 | Kale et al. | 525/240 |
| 5,272,236 | 12/1993 | Lai et al. | 526/348.5 |
| 5,278,272 | 1/1994 | Lai et al. | 526/348.5 |
| 5,371,143 | 12/1994 | Novak et al. | 525/88 |
| 5,380,810 | 1/1995 | Lai et al. | 526/352 |
| 5,382,631 | 1/1995 | Stehling et al. | 525/240 |
| 5,387,630 | 2/1995 | Edwards et al. | 524/210 |
| 5,408,004 | 4/1995 | Lai et al. | 525/240 |
| 5,464,905 | 11/1995 | Tsutsui et al. | 525/240 |
| 5,470,993 | 11/1995 | Devore et al. | 556/11 |
| 5,492,760 | 2/1996 | Sarma et al. | 428/378 |
| 5,578,682 | 11/1996 | White | 525/282 |
| 5,589,539 | 12/1996 | Wagner et al. | 525/240 |

FOREIGN PATENT DOCUMENTS

| | | | |
|---|---|---|---|
| 584927 | 3/1994 | European Pat. Off. | C08L 23/04 |
| 7-207054 | 8/1995 | Japan | C08J 9/06 |
| 8262 | 6/1991 | WIPO . | |
| WO 91/08262 | 6/1991 | WIPO | C08L 43/04 |
| 13143 | 7/1993 | WIPO . | |
| WO 93/13143 | 7/1993 | WIPO | C08F 10/02 |
| 94/06858 | 3/1994 | WIPO | C08L 23/04 |
| 94/17112 | 8/1994 | WIPO | C08F 210/02 |
| 95/29197 | 11/1995 | WIPO | C08F 255/02 |
| 96/12762 | 5/1996 | WIPO | C08L 23/04 |
| 97/33921 | 9/1997 | WIPO | C08F 2/00 |

OTHER PUBLICATIONS

International Search Report dated Mar. 14, 1997 issued PCT/US96/15863.

Phillips, P.J., et al., *Crosslinking of Homogeneous Polyethylenes*, May 1–4, 1994, Society of Plastics Engineers Conference Proceeeings. vol. II.

Kurian, Philip et al., *Effect of Controlled Crosslinking on the Mechanical and Rheological Properties of HDPE/LLDPE Blends*, 1992, pp. 113–116, Eur. Polym. J. vol. 28, No. 1.

Williams & Ward, J. of Polymer Science, Polymer Letters, vol. 6 (621–624) 1968.

Dealy, J., Melt Rheology and its Role in Plastics Processing, pp. 595–599, Van Nostrand Reinhold Co., 1990.

Atkinson, K.E., An Introduction to Numerical Analysis, pp. 452–453, John Wiley & Sons, Inc., 1978.

Randall, Rev. Macromol. Chem. Phys., C29 (2&3) pp. 285–297 (1989).

Wild et al., Journal of Polymer Science, Poly. Phys. Ed., vol.20, pp. 441–445, 1982.

Shida, M. et al., Polymer Engineering Sciences, vol. 17, No. 11, pp. 769–774, 1977.

Dealy, J., Rheometers for Molten Plastics, pp. 97–99, Van Nostrand Reinhold Co. 1982.

Ramamurthy, Journal of Rheology, 30(2), pp. 337–357, 1986.

(List continued on next page.)

*Primary Examiner*—Donald R. Wilson

[57] ABSTRACT

Crosslinkable polyolefin compositions, articles prepared from such compositions, and processes for making such compositions are described that possess both good processability and fast cure rates. The crosslinkable polyolefin compositions are bidisperse blends of ethylene polymers of the same polymer family having differing number average molecular weights as obtained by deconvolution in which $M_{n1}/M_{n2} > 7$, $M_{n2} > 3000$ and $0.7 \geq (A_1/(A_1+A_2)) \geq 0.15$ wherein $M_{n1}$ represents the number average molecular weight of the first deconvoluted component, $M_{n2}$ represents the number average molecular weight of the second deconvoluted component, and $A_1$ and $A_2$ are the relative proportions of the first and second components. These crosslinkable polyolefin compositions are useful for the manufacture of various articles, such as wire and cable coatings, weather-stripping and seals, gaskets, articles made from foamed and/or sponge-like crosslinked polyolefin or either closed or open cell structure and/or combinations thereof, hollow containers, hollow tanks, medical appliances, drapes and coverings, items of health and personal care, fibers, tapes, tubes, pipes and hoses, bellows, boots, gaiters, footwear, etc.

22 Claims, 9 Drawing Sheets

OTHER PUBLICATIONS

Publication 811–2–1 of the International Electrotechnical Commission Standard 1986, pp. 15 and 17.

Flory, P.J., *Constitution of Three–Dimensional Polymers and the Theory of Gelation,* 46 Journal of Physical Chemistry 132–40 (1942).

Flory, P.J., *Effects of Molecular Structure on Physical Properties of Butyl Rubber,* 38 Industial and Engineering Chemistry 417–36 (1946).

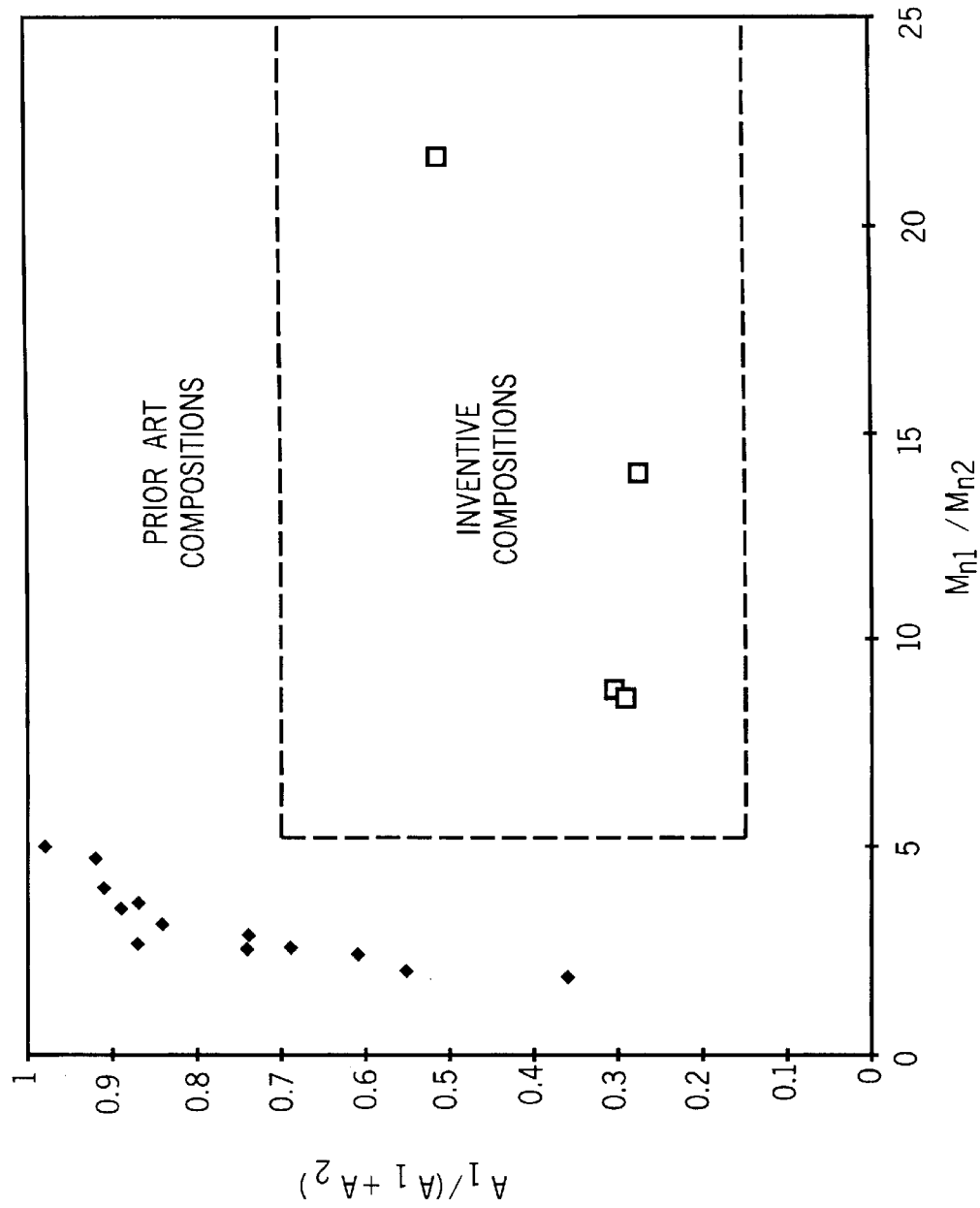

CROSSLINKABLE BIMODAL POLYOLEFIN COMPOSITIONS

CROSS-REFERENCE TO RELATED APPLICATION

This application is a divisional of copending U.S. patent application Ser. No. 08/538,689 filed Oct. 3, 1995.

FIELD OF THE INVENTION

This invention relates to polyolefins. In one aspect, the invention relates to crosslinkable polyolefin compositions, particularly polyethylene compositions, that possess both good processability and fast cure rates. In another aspect, the invention relates to crosslinkable, bidisperse polyolefin compositions of the same family differing in number average molecular weight that are useful in a wide range of fabrication technologies, e.g. wire and cable extrusion, rotomolding, profile extrusion, injection molding, extrusion blow molding, injection blow molding, thermoforming, top forming, press blowing, slot die extrusion, sheet die extrusion, blown film extrusion, powder coating and the like. In yet another aspect, the invention relates to a process of enhancing the processability of a polyolefin composition while maintaining a relatively fast cure rate. In still another aspect, the invention relates to various articles of manufacture, e.g. wire and cable coatings, weather-stripping and seals, gaskets, articles made from foamed and/or sponge-like crosslinked polyolefin of either closed or open cell structure and/or combinations thereof, hollow containers, hollow tanks, medical appliances, drapes and coverings, items of health and personal care, fibres, tapes, tubes, pipes and hoses, bellows, boots, gaiters, footwear, etc. made from crosslinkable polyolefin compositions.

BACKGROUND OF THE INVENTION

Polyolefin compositions can be processed into shaped articles using various techniques. For many end uses the articles should be crosslinked. Crosslinking usually takes place during or following the processing step.

Generally, such polyolefin compositions should process relatively easily and should crosslink or cure relatively fast. The rate of cure, i.e. the time required to attain a desired or optimum state of cure, is generally considered to be dependent on a number of factors.

It is generally accepted that the higher the temperature of curing or the greater the molecular weight, the higher the cure rate.

Short cure times are desired as they as it enhance productivity and reduce "work-in-progress inventory". On the other hand, less severe (e.g. lower temperature) curing conditions are desirable in order, for example, to reduce energy consumption or to facilitate handling of fabricated and semi-finished parts.

Another important aspect is the processability of the composition. Various indices have been proposed as a measure of the processability of a polymeric composition. Amongst the best known are the Melt Index, also called $I_2$, as measured according to ASTM D-1238 (Condition 190/2.16, formerly Condition E). Melt Index is a useful processability indicator when comparing polymers within the same family. Generally the lower the value of the Melt Index the harder the polymer is to process. Higher molecular weight polyolefins generally have a Melt Index which is lower, and, therefore, higher molecular weight polyolefins are more difficult to process. For example, during injection molding low values of Melt Index result in higher pressure requirements in order to fill mold cavities, and in the case of excessively low values of Melt Index, it may be impossible to completely fill the mold cavity, in addition to consuming unnecessary amounts of energy to make the polymer flow.

Another measure of processability is the shear rate (or the shear stress) at which the, polyolefin composition shows melt fracture during processing. It is preferable for the shear rate (or shear stress) at which the onset of melt fracture occurs to be as high as possible so as to allow high rates of fabrication of finished and semi-finished articles. It is generally considered that, for a given molecular weight distribution, the shear rate corresponding to the onset of surface melt fracture is reduced as the average molecular weight of a polyolefin composition is increased.

John Dealy in "Melt Rheology and Its Role in Plastics Processing", published by Van Nostrand Reinhold Co. in 1990, discloses on page 597 that the measurement of Melt Index according to ASTM D-1238, employing different loads will give an estimate of the shear rate dependence of melt viscosity, which is sensitive to the weight average molecular weight ($M_w$) and the number average molecular weight ($M_n$). Most commonly the ratio of the Melt Index at 190° C. measured under 10 kg. to that measured under 2.16 kg. is used as a measure of sensitivity to shear thinning. This ratio is commonly referred to as $I_{10}/I_2$.

Stehling et al teach in U.S. Pat. Nos. 5,387,630 and 5,382,631 (corresponding to WO 90/03414), which are incorporated herein by reference, that specific blends of narrow molecular weight distribution linear low density polyethylenes, essentially characterized by a polydispersity index ($M_w/M_n$) of the blend exceeding a value of three, provided that the value of $M_w/M_n$ for each of the blend components is less than three, offer enhanced tear resistance and reduced "extractability" compared with prior art compositions. This publication does not teach crosslinking these compositions.

A polyolefin composition that possesses both high cure rate and excellent processability has been identified by the industry as a desirable product and, in the face of the contradictory requirements of low molecular weight (to enhance processability) and high molecular weight (to enhance the cure rate), much effort has been expended by those skilled in the art to attempt to find a balance between the two opposing requirements, or to optimise processing machinery and operating conditions so as to minimise the disadvantages, or to attempt to discover alternative methods of overcoming the problem.

Processors of crosslinkable polyolefin compositions expend great efforts, for example, in choosing precise dimensions of tooling so as to minimise the severity of pressure drops as. polymer is forced to flow through the shaping dies, thereby allowing for the use of higher molecular weight polyolefins and providing for the benefits of shorter cure times as a result. However, the optimum shaping tool and die design for one polyolefin composition is not necessarily advantageous for another polyolefin composition, and it therefore becomes necessary to change the flow path and shaping die design with each change of production, and in any case the benefits to be obtained are small if the initial design conforms to good industrial practice.

Various forms of "processing aid" have been proposed. Amongst such processing aids may be cited as examples calcium stearate, zinc stearate, magnesium stearate, mineral oils of various viscosity (typically from 50 to 150 centistokes), microcrystalline paraffin wax, polyethylene glycols and the like either alone or in combination. Varrall et al in WO 91/08262 teach the addition of up to 10% polyethylene wax to LLDPE for the purpose of improving the processability of silane crosslinkable LLDPE intended for the manufacture of wire and cable insulation and coverings. Generally the intention is to reduce the friction between the polymeric melt and the internal surfaces of the shaping die and associated flow passages. Typically the additive migrates at least partially from the molten polymer composition to the interface with the die, thereby lubricating the said interface. It is in the nature of such lubricants that they are eroded away from the polymer/metal interface in the course of their use, and thus they must be regularly replenished by a continual addition of the active process aid additive. This adds considerably to the cost of the processing operation. Since the eroded process aid not uncommonly remains included in the mass or attached to the surface of the processed polymer, this causes a lack of purity which poses potential problems in the use and longevity of the fabricated article, such as inferior sealing properties, greater difficulty to print on the surface, poorer electrical properties and the like.

A method to improve the processability of narrow molecular weight distribution polyethylenes such as LLDPE is suggested by Varrall et al in WO 91/08262. Varrall et al suggest using blends of LDPE with LLDPE for silane crosslinkable polyethylene compositions intended for wire and cable insulation and covering, in order to improve the extrudability of LLDPE compositions.

An alternative approach has been to employ mixtures of polyethylene of high molecular weight with polyethylene of low molecular weight. For example, Varrall et al mention in WO91/08262 that a blend of a first LLDPE having a Melt Index from 0.2 to 10 and a second LLDPE having a Melt Index 20 to 50, most preferably in the proportions of 30 to 70% of the first component to 70 to 30% of the second component will provide a good balance of cure speed and processability for silane crosslinking systems for the manufacture of wire and cable coatings and insulation. However, they fail to give an example of such a composition.

Yet another example of an attempt to define optimum blend proportions and composition is provided by Wong et al in EP584927 in which they teach that addition of a small quantity of an "auxilliary" polymer component which is co-crystallisable with a "main" polymer component which is derived from ethylene and optionally at least one higher alpha-olefin will reduce the time necessary to attain optimum cure without significantly worsening the processability. However they also teach that it is preferable to add a polymeric processing aid in the form of a fluorinated polymer and/or a polymer derived from ethylene and optionally at least one olefinically unsaturated co-monomer having a Melt Index at least 5 grams/10 minutes greater than that of the "main" component.

Despite the previous attempts, there is a desire to provide crosslinkable polyethylene compositions which have both good processability and good cure rate.

SUMMARY OF THE INVENTION

The present invention provides compositions having an improved combination of processability and enhanced curing rate. The polyolefin compositions of the invention comprise at least one olefin polymer, preferably ethylene polymer, said composition satisfying the following conditions:

$M_{n1}/M_{n2} > 5$, $M_{n2} > 3000$ and $0.7 \geq (A_1/(A_1+A_2)) \geq 0.15$, wherein $A_1$, $A_2$, $Mn_1$, and $Mn_2$ are derived from the molecular weight distribution of the composition obtained via gel permeation chromatography (GPC) by deconvoluting the relative response (RR) as function of the molecular weight (MW) to fit RR and MW to the following function which is a weighted sum of two log normal distribution functions:

$$RR = \frac{A_1}{\sigma_1\sqrt{2\pi}} \exp\left(-\left(\frac{\log(MW) - \mu_1}{\sigma_1\sqrt{2}}\right)^2\right) + \frac{A_2}{\sigma_2\sqrt{2\pi}} \exp\left(-\left(\frac{\log(MW) - \mu_2}{\sigma_2\sqrt{2}}\right)^2\right)$$

using a nonlinear regression technique to obtain values for $A_1$, $A_2$, $\mu_1$, $\mu_2$, $\sigma_1$, and $\sigma_2$, wherein
MW is the GPC molecular weight value;
RR is the relative response which for an individual RR/MW data set is RR[i]=Normalized Height[i]/(log (MW[i−1])−log (MW[i]))

in which the Normalized Height [i] is the GPC output for the corresponding MW(i);

$\mu_1$ and $\sigma_1^2$ represent the mean and standard deviation of the first log normal distribution;

$\mu_2$ and $\sigma_2^2$ represent the mean and standard deviation of the second log normal distribution;

$A_1+A_2=1$ and $0<A_1<1$;

$M_{n1}=10^{\mu_1} \exp(-0.5 (\ln(10)\times\sigma_1)^2)$ and $M_{n2}=10^{\mu_2} \exp(-0.5 (\ln(10)\times\sigma_2)^2)$.

The present invention further provides a process for making a polyolefin composition comprising:

a) preparing a first olefin polymer and a second olefin polymer;

b) blending the first and second olefin polymers such that the first and second olefin polymers are homogeneously mixed to provide a polyolefin composition satisfying the following conditions:

$M_{n1}/M_{n2} > 5$, $M_{n2} > 3000$ and $0.7 \geq (A_1/(A_1+A_2)) \geq 0.15$, wherein $M_{n1}$, $M_{n2}$, $A_1$ and $A_2$ are derived from the molecular weight distribution of the composition obtained via gel permeation chromatography (GPC) by deconvoluting the relative response (RR) as function of the molecular weight (MW) to fit RR and MW to the following function which is a weighted sum of two log normal distribution functions:

$$RR = \frac{A_1}{\sigma_1\sqrt{2\pi}} \exp\left(-\left(\frac{\log(MW)-\mu_1}{\sigma_1\sqrt{2}}\right)^2\right) +$$
$$\frac{A_2}{\sigma_2\sqrt{2\pi}} \exp\left(-\left(\frac{\log(MW)-\mu_2}{\sigma_2\sqrt{2}}\right)^2\right)$$

using a nonlinear regression technique to obtain values for $A_1$, $A_2$, $\mu_1$, $\mu_2$, $\sigma_1$, and $\sigma_2$, wherein
MW is the GPC molecular weight value;
RR is the relative response which for an individual $RR/M_w$ data set is RR[i]=Normalized Height[i]/(log (MW[i−1])−log (MW[i]))

in which the Normalized Height [i] is the GPC output for the corresponding MW (i);

$\mu_1$ and $\sigma_1^2$ represent the mean and standard deviation of the first log normal distribution;

$\mu_2$ and $\sigma_2^2$ represent the mean and standard deviation of the second log normal distribution;

$A_1 + A_2 = 1$ and $0 < A_1 < 1$;

$M_{n1} = 10^{\mu_1} \exp(-0.5(\ln(10) \times \sigma_1)^2)$ and $M_{n2} = 10^{\mu_2} \exp(-0.5(\ln(10) \times \sigma_1)^2)$.

Another aspect of the present invention is articles comprising a crosslinked polyolefin composition obtainable by curing a crosslinkable polyolefin composition of the present invention.

A further aspect of the invention is a process for crosslinking said crosslinkable composition.

BRIEF DESCRIPTION OF THE DRAWINGS

FIG. 4 represents an extreme case of bi-dispersity.

FIG. 10 graphically illustrates the distinction between the prior art compositions and the present invention based on the deconvolution parameters $M_{n1}$, $M_{n2}$, $A_1$, and $A_2$ presented in Table 9.

DESCRIPTION OF THE PREFERRED EMBODIMENTS

Where in the application the terms $M_n$ and $M_w$ or the terms overall $M_n$ and overall $M_w$ are used, these refer to the number average molecular weight and weight average molecular weight, respectively, of the overall polyolefin composition, as opposed to $M_{n1}$ and $M_{n2}$ which represent characteristics of the polyolefin composition obtained by the specified deconvolution method.

According to the present invention it is surprisingly established that the inventive compositions exhibit an improved combination of processability and cure rate compared to prior art compositions of a similar overall number average molecular weight, $M_n$, and of a similar density. The present inventors have found that such improved properties are related to specific molecular weight parameters as explained in more detail hereinafter.

Figure 1:
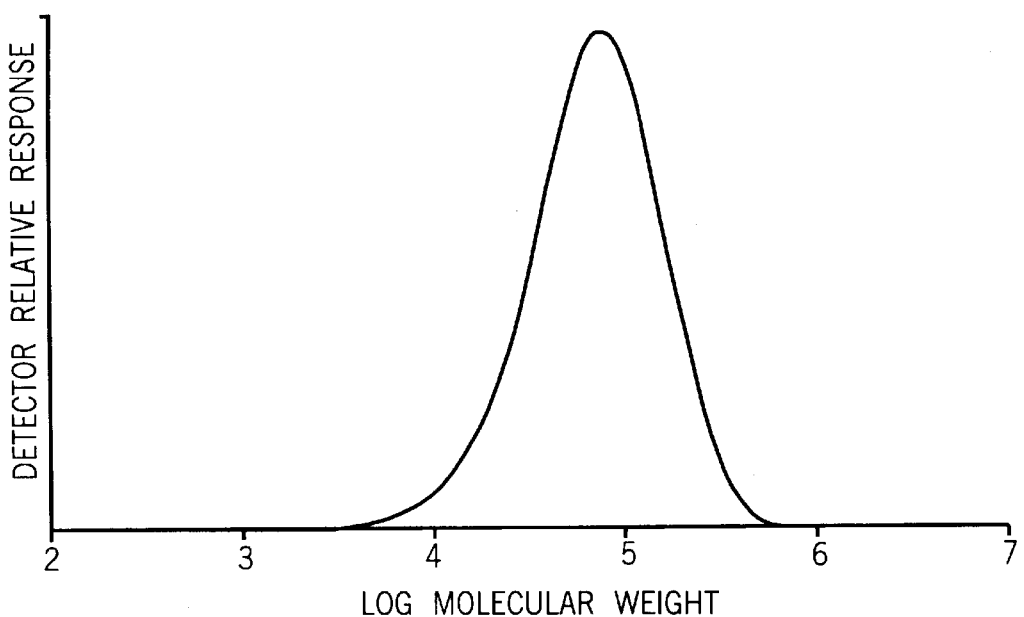
FIG. 1 illustrates a gel permeation chromatogram for the prior art polyethylene Tafmer™ P0480.
Figure 2:
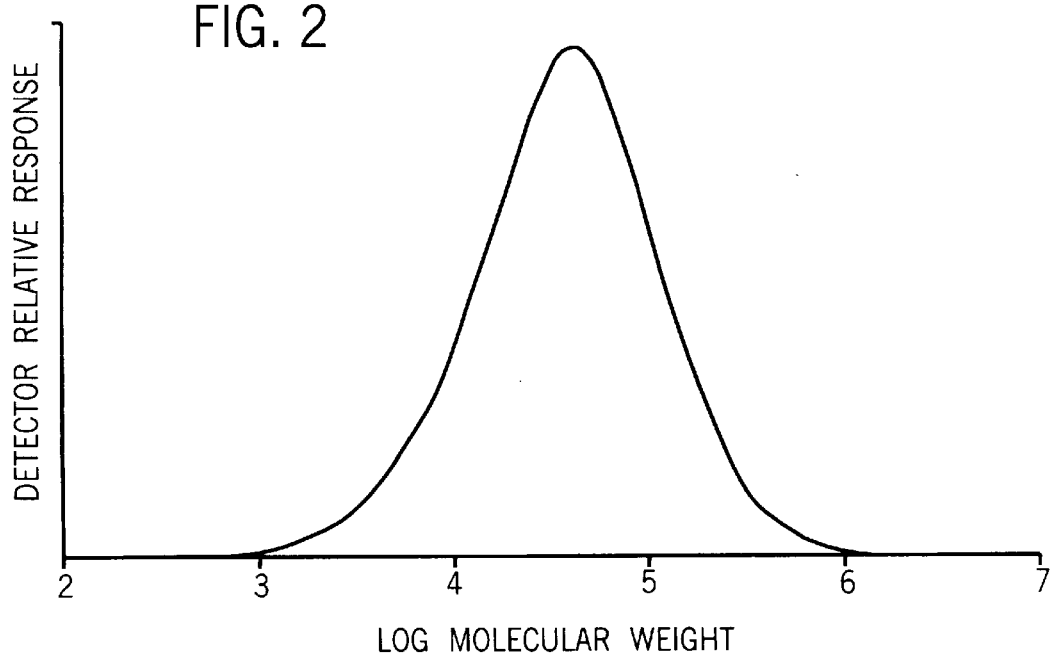
FIG. 2 illustrates a gel permeation chromatogram for a prior art polyethylene having an overall $M_n$ of 19,400, an overall $M_w$ of 64,100 and a polydispersity index of 3.3.
Figure 3:
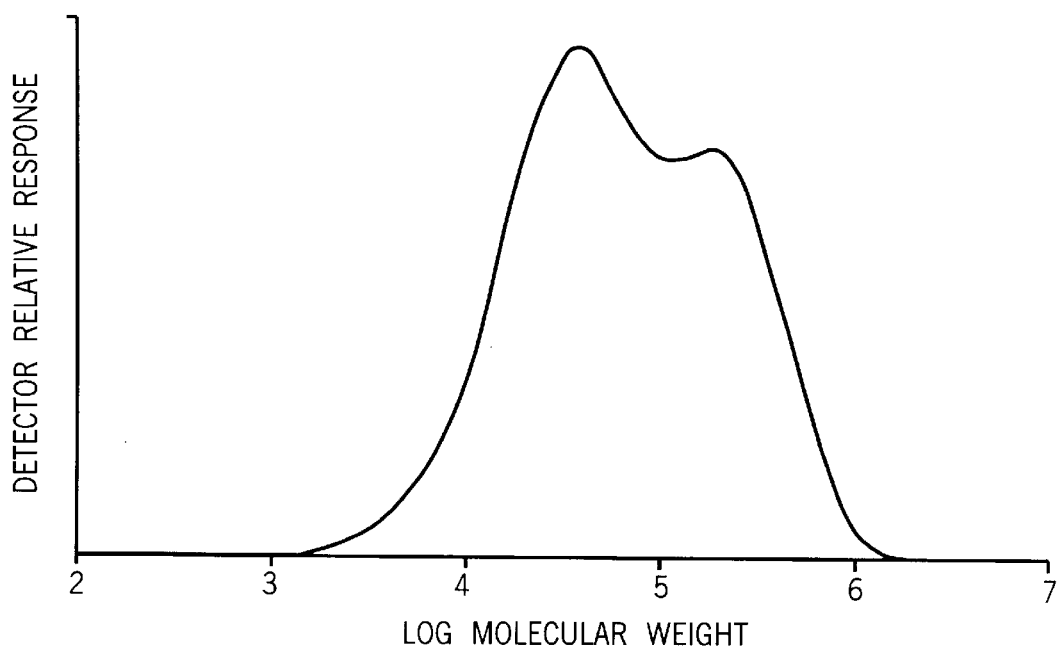
FIG. 3 illustrates a gel permeation chromatogram for an exemplary olefin composition according to the present invention corresponding to Example 2 having an overall $M_n$ of 29,900, an overall $M_w$ of 124,000 and a polydispersity index of 4.14. The bi-disperse nature of the molecular weight distribution is clearly evident.
Figure 4:
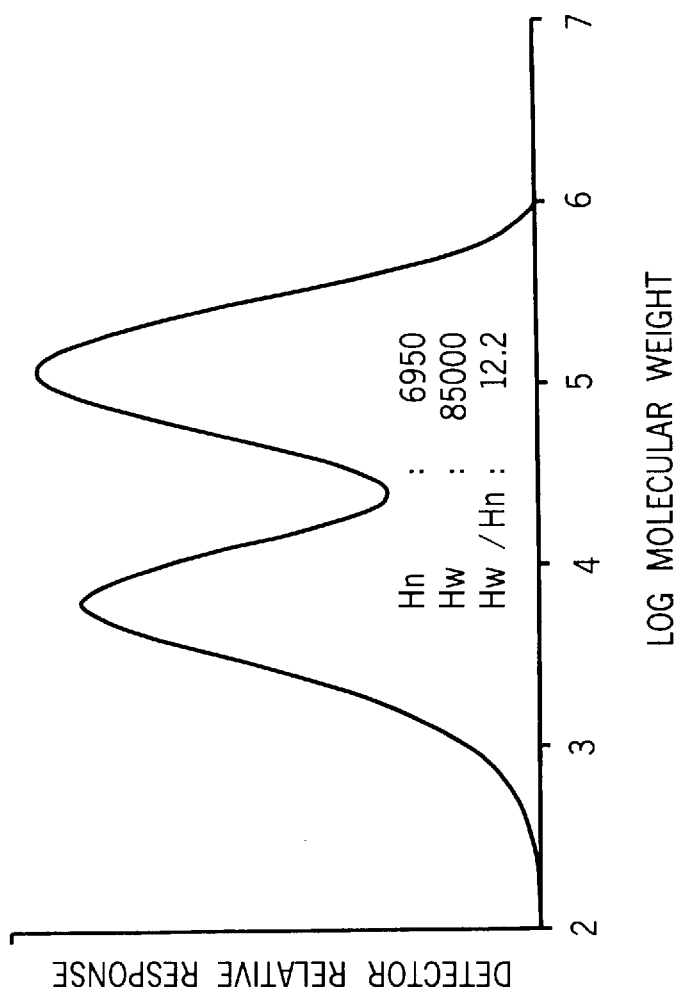
FIG. 4 illustrates a gel permeation chromatogram for another exemplary olefin composition according to this invention corresponding to Example 3 having an overall $M_n$ of 6950; an overall $M_w$ of 85,000; and a polydispersity index of 12.2.

The parameters $A_1$, $A_2$, $M_{n1}$, and $M_{n2}$ used to describe the present polyolefin compositions are derived from GPC analysis of samples of these compositions. FIG. 1 and FIG. 2 are representative GPC curves of prior art polyolefin compositions. FIG. 3 and FIG. 4 are representative GPC curves of polyolefin compositions according to the present invention.

The samples are analyzed by gel permeation chromatography on a Waters 150° C. high temperature chromatographic unit equipped with three pl-gel 10 $\mu$m mixed-% columns operating at a system temperature of 140° C. The solvent is 1,2,4-trichlorobenzene from which 0.2 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M_{polyethylene} = a^*(M_{polystyrene})^b.$$

In this equation, a=0.4316 and b=1.0. Weight average molecular weight, $M_w$, is calculated in the usual manner according to the following formula: $M_w = \Sigma w_i^* M_i$, where $w_i$ and $M_i$ are the weight fraction and molecular weight, respectively, of the $i^{th}$ fraction eluting from the GPC column.

By subjecting the GPC curves to deconvolution by nonlinear regression based on the dual log-normal distribution function set forth above, the values of $A_1$, $A_2$, $\sigma_1$, $\sigma_2$, $\mu_1$ and $\mu_2$ can be calculated for each gel permeation chromatogram. The values of $\mu_1$ and $\sigma_1$, respectively $\mu_2$ and $\sigma_2$ are used to calculate the values of $M_{n1}$ and $M_{n2}$.

The above deconvolution method provides two log-normal distributions, each of which is characterized by the values of $M_{ni}$, $\sigma_i$, and $\mu_i$. The benefits of the present invention were found to occur when $M_{n1}$ and $M_{n2}$ satisfied the relationship specified above. $M_{n1}$ can be considered to represent the number average molecular weight of the log normal distribution corresponding to the higher molecular weight fractions, as obtained by the specified deconvolution method. Analogously, $M_{n2}$ can be considered to represent the number average molecular weight of the log normal distribution corresponding to the lower molecular weight fractions, as calculated by the specified method.

The greater the $M_{n1}$ to $M_{n2}$ ratio, the greater the processability of the polyolefin composition. However, to maintain the desired cure rate of the composition the value of $M_{n1}/M_{n2}$ must be greater than 5, preferably greater than 6.5 and more preferably greater than 7.0. If the ratio of $M_{n1}/M_{n2}$ is less than the 5, the benefit of the improvement in cure rate will not be obtained.

According to the present invention, it is preferred that the composition comprises of blend components chosen from the families of homogeneous linear PE or from the family of substantially linear ethylene polymers. Most preferred are compositions obtained from two SLEPs.

The value $M_{n2}$ is greater than 3,000 and is preferably greater than 4,000.

Furthermore the ratio $A_1/(A_1+A_2)$, which can be regarded as the relative contribution of the first log normal distribution (which is characterized by $\mu_1$ and $\sigma_1$) to the weighted sum of the first and second log normal distributions obtained by applying the dual log normal deconvolution function described above to the gel permeation chromatogram of the composition, must fall within certain limits. The ratio of $A_1$ to $(A_1+A_2)$ must be greater than or equal to 0.15, and preferably greater than or equal to 0.2 and more preferably greater than or equal to 0.25. Also the ratio of $A_1$ to $(A_1+A_2)$ must be less than or equal to 0.7, preferably less than or equal to 0.65, and more preferably less than or equal to 0.6. If the ratio of $A_1$ to $(A_1+A_2)$ is not in the range from 0.7 to 0.15, the rate of cure will be lower than desirable, and also the shear thinning effect associated with bi-modal molecular weight distribution polymers will be diminished, resulting in a worsening of processability.

The values for $A_1$, $A_2$, $M_n$, and $M_{n2}$ result from the application of non-linear least squares analysis of a series of data points generated by GPC expressed in the form of log MW versus relative response. The actual incremental relative response, Relative Response [i], corresponding to a particular log MW[i], is expressed by the formula:

$$\text{Relative Response}[i] = \frac{\text{Normalized Height}[i]}{\log(MW[i-1]) - \log(MW[i])}$$

where the Normalized Height (i) and MW [i-1] and MW [i] are obtained from the GPC data. For i equal to 1, the relative response is zero. The sum of all the Normalized Heights [i] equals 1.

The numerical method used for curve fitting is the method of Choleski decomposition with numerically determined first derivatives with errors in all variables as taught in Technical University of Eindhoven (The Netherlands) PP-5.3, Non-linear Regression Without Limits, 1989 TUE-RC 68438 and in "An Introduction to Numerical Analysis" by K. E. Atkinson, published by John Wiley & Sons, Inc. in 1978, each of which is fully incorporated herein by reference for their relevant disclosure. This numerical analysis can be carried out using commercially available software, such as RRGraph™ from Reactor Research Foundation, which is registered at the Chamber of Commerce of Delft, The Netherlands, under registration no. S145980. Such non-linear least squares analysis applies the dual log normal distribution function to the series of datapoints represented by log (MW [i]) versus Relative Response [i] to determine the values of $A_1$, $A_2$, $\sigma_1$, $\sigma_2$, $\mu_1$ and $\mu_2$ which provide the best fit to the log (MW [i]) versus Relative Response [i] datapoints. Initial starting values for the parameters $A_1$, $A_2$ (equals 1−$A_1$), $\mu_1$, $\mu_2$, $\sigma_1$ and $\sigma_2$ are based on knowledge of the composition and/or shape of the GPC curve. Starting values which have proven to give successful deconvolutions are as follows: $A_1$=0.4–0.6; $\mu_1$ of about 5; $\mu_2$ of about 4; $\sigma_1$ and $\sigma_2$ each of about 0.35. If the deconvolution is not successful, the starting values may be adjusted in view of the shape of the GPC curve.

The values $A_1$, $A_2$, $M_{n1}$, and $M_{n2}$ calculated as explained above are obtained from the composition and may not coincide, in the case of an actual blend, with the respective actual blend ratios and number average molecular weights of the blend components. Thus, the ratio of $A_1$ to $(A_1+A_2)$ does not necessarily correspond to the actual blend ratios in the case that the composition is made by blending of two or more polymer components. Nor do the values of $M_{n1}$ or $M_{n2}$ necessarily correspond to the actual values of $M_n$ which would have been obtained by gel permeation chromatography of the separate blend components prior to blending. The present compositions may comprise more than two olefin polymer components especially when prepared via blending, provided the overall composition satisfies the conditions specified above.

The polyolefin compositions of this invention generally may be obtained by blending two or more polyolefins, preferably of like kind. By "like kind" is meant that the blend components are selected from the same family. As such, polyolefin compositions of this invention include blends of two or more linear PEs, or blends of two or more LDPEs, or of two or more SLEPs, etc, but not blends of linear PE and LDPE, etc.

Low density polyethylene ("LDPE") is generally prepared at high pressure using free radical initiators and typically has a density in the range of 915–940 kilograms per cubic meter ($kg/m^3$). LDPE is also known as "branched" polyethylene because of the relatively large number of long chain branches extending from the main polymer backbone. LDPE comprises ethylene and may comprise, optionally, small quantities (e.g. up to about 5 wt. %) of co-monomers such as propylene, butene-1, vinyl acetate, butyl acrylate and the like.

Ethylene polymers and copolymers prepared by the use of a co-ordination catalyst, such as a Ziegler or Phillips catalyst, are generally known as linear polyethylene ("linear PE") because of the substantial absence of branch chains of polymerised monomer units pendant from the backbone. Linear PE includes HDPE and LLDPE, which latter term for the present purposes includes ULDPE and VLDPE. High density polyethylene ("HDPE"), generally having a density of about 941 to about 967 $kg/M^3$, is typically a linear homopolymer of ethylene or an interpolymer of ethylene and a small quantity of α-olefin, and it contains relatively few branch chains relative to the various linear interpolymers of ethylene and an α-olefin. As here used, "interpolymer" means a polymer of two or more comonomers, e.g. a copolymer, terpolymer, etc.

Linear low density polyethylene ("LLDPE") is typically an interpolymer of ethylene and an α-olefin of 3 to 12 carbon atoms, preferably 4 to 8 carbon atoms (e.g., 1-butene, 1-octene, etc.), that has sufficient α-olefin content to reduce the density of the interpolymer to that of LDPE. LLDPE is a member of the family of linear PE's. When the interpolymer contains even more α-olefin, the density will drop below about 910 kg/M³ and these interpolymers are known as ultra low density polyethylene ("ULDPE") or very low density polyethylene ("VLDPE"). The densities of these linear polymers generally range from about 865 to 910 kg/m³. VLDPE and ULDPE are both members of the family of linear PE's.

Linear ethylene interpolymers comprise homogeneously branched and heterogeneously branched LLDPE's. Heterogeneous LLDPEs generally have a very broad, non-uniform distribution of co-monomer content, i.e. some polymer molecules have a relatively high α-olefin co-monomer content while others have a relatively low content. Generally, the polymer molecules of low co-monomer content are relatively more crystalline and have a high melting temperature, whereas the high co-monomer content polymer molecules are more amorphous and melt at a lower temperature.

Homogeneously branched linear polyethylenes that can be used in the practice of this invention (also called "homogeneous linear polyethylene" or "homogeneous linear PE" or "homogeneous LLDPE") are known, and their method of preparation is described in U.S. Pat. No. 3,645,992 to Elston, which is incorporated into and made a part of this application by reference. Examples of homogeneous LLDPE's are Tafmer™ polymers of Mitsui and Exact™ polymers of Exxon. Tafmer™ and Exact™ are trademarks of Mitsui and Exxon, respectively.

A different family of olefin polymers is that of the substantially linear olefin polymers. The substantially linear olefin polymers, and more in particular substantially linear ethylene polymers (SLEP's), and their method of preparation are described in U.S. Pat. Nos. 5,272,236, 5,278,272 and 5,380,810, which are incorporated herein by reference. SLEP's are available from The Dow Chemical Company as Engage® polyolefin elastomers and Affinity® polyolefin plastomers. Engage® and Affinity® are trademarks of The Dow Chemical Company.

As here used, "substantially linear" means that the bulk polymer has an average of about 0.01 long-chain branches/1000 carbons to about 3 long-chain branches/1000 carbons, preferably from about 0.01 long-chain branches/1000 carbons to about 1 long-chain branch/1000 carbons, and more preferably from about 0.05 long-chain branches/1000 carbons to about 1 long-chain branch/1000 carbons. In contrast, simply "linear" means that the polymer backbone is substituted with less than about 0.01 long chain branches/1000 carbons.

The term "bulk" polymer means the polymer which results from the polymerization process and, for the substantially linear polymers, includes molecules having both an absence of long chain branching, as well as molecules having long chain branching. Thus a "bulk" polymer includes all molecules formed during polymerization. It is understood that, for the substantially linear polymers, not all molecules have long chain branching, but a sufficient amount do such that the average long chain branching content of the bulk polymer positively affects the melt rheology (i.e., the melt fracture properties).

Long chain branching (LCB) is defined herein as a chain length of at least one (1) carbon less than the number of carbons in the comonomer, whereas short chain branching (SCB) is defined herein as a chain length of the same number of carbons in the residue of the comonomer after it is incorporated into the polymer molecule backbone. For example, an ethylene/1-octene substantially linear polymer has backbones with long chain branches of at least seven (7) carbons in length, but it also has short chain branches of only six (6) carbons in length.

Long chain branching can be distinguished from short chain branching by using $^{13}C$ nuclear magnetic resonance (NMR) spectroscopy and to a limited extent, e.g. for ethylene homopolymers, it can be quantified using the method of Randall (Rev. Macromol. Chem. Phys., C29 (2&3), p.285–297), the disclosure of which is incorporated herein by reference. However as a practical matter, current $^{13}C$ NMR spectroscopy cannot determine the length of a long chain branch in excess of about six (6) carbon atoms and as such, this analytical technique cannot distinguish between a seven (7) carbon branch and a seventy (70) carbon branch. The long chain branch can be as long as about the same length as the length of the polymer back-bone.

U.S. Pat. No. 4,500,648, incorporated herein by reference, teaches that long chain branching frequency (LCB) can be represented by the equation $LCB = b/M_w$ wherein b is the weight average number of long chain branches per molecule and $M_w$ is the weight average molecular weight. The molecular weight averages and the long chain branches characteristics are determined by gel permeation chromatography and intrinsic viscosity methods.

As here used, "homogeneously branched" means that the comonomer is randomly distributed within a given molecule and that substantially all of the copolymer molecules have the same ethylene/co-monomer ratio. The distribution or homogeneity of co-monomer branches for the substantially linear ethylene interpolymers and homopolymers is characterized by its SCBDI (Short Chain Branch Distiibution Index) or CDBI (Composition Distribution Branch Index), and it is defined as the weight percent of the polymer molecules having a comonomer content within 50 percent of the median total molar co-monomer content. The CDBI of a polymer is readily calculated from data obtained from techniques known in the art, such as, for example, temperature rising elution fractionation (abbreviated herein as "TREF") as described, for example, by Wild et al., Journal of Polymer Science, Poly. Phys. Ed., Vol. 20, p. 441 (1982), or in the U.S. Pat. No. 4,798,081, both disclosures of which are incorporated herein by reference. The SCBDI or CDBI for the substantially linear homogeneously branched interpolymers in the preferred polymer compositions according to the present invention is generally greater than about 30 percent, preferably greater than about 50 percent, and especially greater than about 80 percent.

Both the linear homogeneously branched polymers and the SLEPs used in this invention have a single melting peak, as measured using differential scanning calorimetry (DSC), in contrast to heterogeneously branched linear ethylene polymers, which have two or more melting peaks due to their broad branching distribution.

The unique characteristic of the SLEPs is a highly unexpected flow property where the $I_{10}/I_2$ value of the polymer is essentially independent of the polydispersity index (i.e., $M_w/M_n$) of the polymer. This is contrasted with conventional linear homogeneously branched and linear heterogeneously branched polyethylene resins having rheological properties such that to increase the $I_{10}/I_2$ value the polydispersity index must also be increased. Preferably, the melt flow ratio, measured as $I_{10}/I_2$ (ASTM D-1238), is greater than or equal to 5.63, and is preferably at least about 6.5, more preferably at least about 7 and may be as high as 20, preferably up to about 15, and more preferably up to about 10.

These unique SLEPs are prepared by using constrained geometry catalysts (CGC), and are characterized by a narrow molecular weight distribution and if an interpolymer, by a narrow or homogeneous comonomer distribution. The molecular weight distribution $(M_w/M_n)$, measured by gel permeation chromatography (GPC), is preferably defined by the equation:

$M_w/M_n \leq (I_{10}/I_2) - 4.63$, and is generally less than 5, preferably between about 1.5 and 2.5, and especially from 1.7 to 2.3.

The preferred melt index, measured as $I_2$ (ASTM D-1238, condition 190/2.16 (formerly condition E)), is from about 0.1 g/10 min to 100 g/10 min, more preferably 1 to 20 g/10 min. Typically, the preferred substantially linear ethylene polymers used in the practice of this invention are homogeneously branched and do not have any measurable high density fraction, (i.e. as measured by Temperature Rising Elution Fractionation), e.g. they do not contain any polymer fraction that has a degree of branching less than or equal to 2 methyl/1000 carbons.

Other basic characteristics of these substantially linear ethylene polymers include a low residuals content (i.e. low concentrations in the substantially linear ethylene polymer of the catalyst used to prepare the polymer, unreacted co-monomers, if any, and low molecular weight oligomers made during the course of the polymerisation), and a controlled molecular architecture which provides good processability even though the molecular weight distribution may be narrow relative to conventional olefin polymers.

The substantially linear olefin polymers used to make the polymer compositions of this invention preferably include substantially linear ethylene polymers, both homo- and interpolymers. The substantially linear ethylene polymers preferably comprise between about 95 and 50 wt % ethylene, and about 5 and 50 wt % of at least one α-olefin comonomer, more preferably 10 to 25 wt % of at least one α-olefin comonomer. Percent co-monomer is measured by infrared spectroscopy according to ASTM D-2238 Method B. Typically, these substantially linear ethylene polymers, as well as the homogeneous linear polyethylenes, are copolymers of ethylene and an α-olefin comonomer of 3 to about 20 carbon atoms (e.g. propylene, 1-butene, 1-hexene, 4-methyl-1-pentene, 1-heptene, 1-octene, styrene, etc.) with a density of 850 to about 967 kg/m$^3$, preferably of 865 to about 960 kg/m$^3$. Preferably, the comonomer is an α-olefin of 4 to 10 carbon atoms, more preferably of from 5 to 10 carbon atoms. Especially preferred are 4-methyl-pentene-1, 1-hexene and 1-octene.

For the substantially linear ethylene polymers, the $I_{10}/I_2$ ratio indicate the degree of long-chain branching, i.e., the greater $I_{10}/I_2$ ratio, the more long-chain branching in the polymer.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99, both publications of which are incorporated herein by reference. GER experiments are performed at a temperature of 190° C., at nitrogen pressures between 250 to 5500 psig using about a 7.54 cm diameter, 20:1 L/D die with an entrance angle of 180°. For the preferred substantially linear ethylene polymers described herein for the polymer compositions of the present invention, the PI is the apparent viscosity (in kpoise) of a material measured by GER at an apparent shear stress of 2.15×10$^6$ dyne/cm$^2$. These substantially linear ethylene interpolymers and homopolyrners preferably have a PI in the range of about 0.01 kpoise to about 50 kpoise, preferably about 15 kpoise or less, which is less than or equal to about 70% of the PI of a comparative linear ethylene polymer (either a Ziegler polymerised polymer or a linear uniformly branched polymer as described by Elston in U.S. Pat. No. 3,645,992) at about the same $I_2$ and $M_w/M_n$.

An apparent shear stress versus apparent shear rate plot is used to identify the melt fracture phenomena. According to Ramamurthy in the *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin". In this disclosure, the onset of surface melt fracture (OSMF) is characterized by the visual appearance of the surface roughness of an extrudate from a capillary rheometer. The critical shear rate at the onset of surface melt fracture for the preferred substantially linear ethylene interpolymers and homopolymers for use in this invention is at least 50 percent greater than the critical shear rate at the onset of surface melt fracture of a comparative linear ethylene polymer having about the same $I_2$ and $M_w/M_n$.

Gross melt fracture occurs at unsteady extrusion flow conditions and ranges in detail from regular (alternating rough and smooth, helical, etc.) to random distortions. For commercial acceptability, (e.g. in blown films and bags therefrom), surface defects should be minimal, if not absent, for good film quality and properties. The critical shear stress at the onset of gross melt fracture for the substantially linear ethylene interpolymers and homopolymers used for making the preferred polymer compositions of the present invention is greater than about 4×10$^6$ dynes/cm2. The critical shear rate at the onset of surface melt fracture (OSMF) and the onset of gross melt fracture (OGMF) will be used herein based on the changes of surface roughness and configurations of the extrudates extruded by a GER.

The rheological behaviour of substantially linear ethylene polymers can also be characterized by the Dow Rheology Index ("DRI"), which expresses the "normalised relaxation time as the result of long chain branching" of a polymer. (See, S. Lai and G. W. Knight ANTEC '93 Proceedings: "INSITE™ Technology Polyolefins (ITP)—New Rules in the Structure/Rheology Relationship of Ethylene α-Olefin Copolymers", New Orleans, La., May 1993, the disclosure of which is incorporated herein by reference). DRI values range from 0 for polymers which do not have measurable long chain branching (e.g., Tafmer™ products available from Mitsui Petrochemical Industries and Exact™ products available from Exxon Chemical Company) to about 15 and is independent of melt index. In general, for low to medium pressure ethylene polymers (particularly at lower densities) DRI provides improved correlations to melt elasticity and high shear flowability relative to correlations of the same attempted with melt flow ratios. For the substantially linear ethylene polymers useful in this invention, DRI is preferably at least 0.1, and especially at least 0.5, and most especially at least 0.8. DRI can be calculated from Equation 1:

$$DRI = (3652879 \times \tau_0^{1.00649}/\eta_0 - 1)10 \quad \text{Equation 1}$$

in which $\tau_0$ is the characteristic relaxation time of the material and $\eta_0$ is the zero shear viscosity (in Poise) of the material. Both $\tau_0$ and $\eta_0$ are the "best fit" values determined by a non-linear regression of the experimental data to the Cross equation (see Equation 2), i.e., $$\eta/\eta_0 = 1/(1+(\gamma \times \tau_0)^n) \quad \text{Equation 2}$$

where n is the power law index of the material, and $\eta$ and $\gamma$ are the measured viscosity (Poise) and shear rate (rad sect$^{-1}$), respectively. Baseline determination of viscosity and shear rate data are obtained using a Rheometrics Mechanical Spectrometer (RMS-800) under dynamic sweep mode from 0.1 to 100 radians/second at 190° C. and a Gas Extrusion Rheometer (GER) at extrusion pressures from 1,000 psi to 5,000 psi (6.89 to 34.5 MPa), which corresponds to shear stress from 0.086 to 0.43 MPa, using a 0.754 mm diameter, 20:1 L/D die at 190° C. Specific material determinations can be performed from 140° to 190° C. as required to accommodate melt index variations.

The blends can be prepared through the physical admixture of two or more like polyolefins, or through in-reactor blending. Preparing the present compositions by physical admixture includes dry blending, melt blending and solution blending, i.e. dissolving one or both of the components in a suitable solvent, such as for example a hydrocarbon, and combining the components followed by removing the solvent or solvents. In-reactor blending typically involves blending the components in a polymerization reactor, during or after the preparation of one or both of the components. Both types of blending, i.e. physical and in-reactor blending, are well known. Preferably, the present compositions are prepared by in-reactor blending using two reactors operated in series or in parallel, or using two or more catalysts in a single reactor or combinations of multiple catalysts and multiple reactors. The general principle of making polymer blends by in-reactor blending using two or more catalysts in a single reactor or combinations of multiple catalysts and multiple reactors is described in WO 93/13143, EP-A-619827, and U.S. Pat. No. 3,914,342, each of which are incorporated herein by reference. The present polyolefin compositions can be prepared by selecting appropriate catalyst and process conditions with a view to the final composition characteristics.

The polyolefin composition of this invention may be crosslinked or cured according to any method known to crosslink saturated polyolefin compositions. Suitable techniques for introducing crosslinks between different molecular chains of an essentially saturated polymer such as polyethylene include a number of mechanisms such as by the reaction with the polyethylene of a peroxide or other free radical generator and optionally a suitable coagent and/or catalyst and/or activator mixed and/or accelerator and/or promoter such as triallyl cyanurate or elemental sulphur. The reaction is usually initiated by heating the shaped article.

Generally, the desired Melt Index will depend on the intended end use of the article fabricated from the composition and the method of manufacturing the article from the crosslinkable composition and may be from 0.01 to 100 grams/10 minutes. For example, a value of Melt Index of between 0.2 to about 5 grams/10 minutes is preferred for articles to be fabricated by extrusion processes such as the blown film technique. Generally, a lower value of Melt Index will be associated with articles requiring higher abuse resistance or those subject to environmental stress crack resistance demands. Articles to be fabricated by injection molding will typically be fabricated from inventive compositions of Melt Index about 4 to 100 grams/10 minutes and most preferably about 5 to 25 grams/10 minutes. Those skilled in the art will apply the usual rules to determine the most appropriate value of desirable Melt Index for the intended use of the composition.

The compositions of the present invention preferably have an overall density of at least 0.850 g/cm$^3$, preferably at least 0.855 g/cm$^3$, more preferably at least 0.860 g/cm$^3$. The overall densities are generally less than 0.907, preferably less than 0.900, more preferably less than 0.890, most preferably less than 0.885 g/cm$^3$. Compositions having densities of less than 0.900 g/cm$^3$ are very suitable for use as coating or insulation for wires and cables, especially for flexible coatings and insulations.

Scott teaches in British Patent 1,286,460 (corresponding to U.S. Pat. No. 3,646,155) that chemically reactive compounds may be grafted to the polymer backbone in such a way that subsequent reactions may take place between the thus grafted compounds attached to different polymeric molecular chains so as to result in crosslinks being formed between the said polymeric molecular chains. Exemplary of such a method is the so-called "silane crosslinking process" wherein unsaturated silanes are grafted onto a polymer, which grafted silanes can subsequently react with moisture in the presence of a catalyst to form crosslinks between polymer chains. Unsaturated silanes suitable for grafting onto a base polymer include silanes of the general formula:

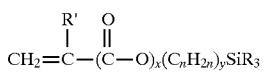

wherein: R' represents a hydrogen atom or methyl group; x and y are 0 or 1 with the proviso that when x is 1, y equals 1; n is an integer from 1 to 12 inclusive, preferably 1 to 4; and each R independently represents a hydrolysable organic group such as an alkoxy group having from 1 to 12 carbon atoms (e.g. methoxy, ethoxy, butoxy), aryloxy group (e.g. phenoxy), araloxy (e.g. benzyloxy), aliphatic acyloxy group having from 1 to 12 carbon atoms (e.g. formyloxy, acetyloxy, propanoyloxy), oximo or substituted amino groups (alkylamino arylamino), or a lower alkyl group having 1 to 6 carbon atoms inclusive, with the proviso that not more than one of the three R groups is an alkyl. Such silanes may be grafted to the polyolefin compositions either before or during a shaping or molding operation. The silane may be grafted to the polymer by any conventional method, typically in the presence of a free radical initiator e.g., an organic initiator, ionizing radiation, etc. Organic initiators are preferred, such as organic peroxides, for example, dicumyl peroxide, t-butyl perbenzoate, benzoyl peroxide, cumene hydroperoxide, t-butyl peroctoate, or methyl ethyl ketone peroxide. The amount of initiator can vary, but it is typically present in an amount of at least 0.04 parts per hundred based on the polyolefin composition (phr), preferably at least 0.06 phr. Typically the amount of initiator does not exceed 0.15 phr and preferably it does not exceed about 0.10phr. The ratio of silane to initiator can also vary widely, but the typical silane:initiator ratio is between 10:1 to 30:1, preferably between 18:1 and 24:1.

Crosslinking of the silane-grafted composition is effected by contacting the silane grafted composition with water or another hydrogen active compound. The said water or compound is allowed to permeate into the polymer from the atmosphere or from a water bath or "sauna", or by the incorporation of a substance into the polymer which is able to release water under appropriate conditions, e.g., the heating of a polymer containing a hydrated filler such as aluminum trihydroxide. The crosslinking reaction usually requires a crosslinking catalyst, which may include a crosslinking agent, activator, promoter, and/or accelerator, and combinations thereof. These catalysts generally include organic bases, carboxylic acids, and organometallic compounds including organic titanates and complexes or carboxylates of lead, cobalt, iron, nickel, zinc and tin; dibutyltin dilaurate, dioctyltin maleate, dibutyltin diacetate, dibutyltin dioctoate, stannous acetate, stannous octoate, lead naphthenate, zinc caprylate, cobalt naphthenate; and the like. Tin carboxylate, especially dibutyltin dilaurate and dioctyltin maleate, are particularly effective for this invention. The catalyst (or mixture of catalysts) is present in a catalytic amount, typically from about 0.01 to about 1.0. preferably from about 0.015 to about 0.10 parts by weight per 100 parts by weight resin, i.e., parts per hundred resin.

Yet other methods of crosslinking the present polyolefin compositions may be used. For example, use may be made of a combination of an electron beam and a crosslinking activator or multifunctional monomer such as ethylene glycol dimethacrylate, tetraethylene glycol dimethacrylate, trimethylolpropane trimethacrylate, trimethylolpropane triacrylate, diethylene glycol diacrylate, diallyl phthalate, triallyl cyanurate, or pentaerythritol tetraacrylate, in order to succesfully crosslink the products of this invention. "Radiation Processing of Polymers" published by Hanser Publishers of Munich, Vienna, New York and Barcelona and edited by A. Singh and J. Silverman (herein incorporated by reference) provides further details of radiation crosslinking technology.

The above mentioned methods of achieving crosslinking in polyethylene should be considered as illustrative and not limitative. The phase of the process during which crosslinks are created between different polymeric molecular chains is also commonly referred to as the "cure phase" and the process itself is also commonly called "curing".

The present olefin composition may contain further additives, such as for example, heat stabilizers, radiation stabilizers such as UV stabilizers, pigments, colorants, extenders or fillers, processing aids, etc. These are advantageously incorporated prior to the crosslinking step.

The compositions of this invention can be used in a wide variety of applications, and are particularly useful in those applications in which short cure times are either required or desired. Illustrative applications include films, extrusion coated and laminated foils, extruded and calendered sheet and foils, wire and cable coatings, weather-stripping and seals, gaskets, articles made from foamed and/or sponge-like crosslinked polyolefin of either closed or open cell structure and/or combinations thereof, hollow containers, hollow tanks, medical appliances, molded cups, drapes and coverings, items of health and personal care, fibers, tapes, tubes, pipes and hoses, bellows, boots, gaiters, footwear, shoe soles and uppers, etc., made from crosslinkable polyolefin compositions. The compositions of this invention may be converted into finished articles or component parts intended for incorporation into the fabrication of other articles by well-known polymer processing methods such as wire and cable extrusion, rotomolding, profile extrusion, injection molding, compression molding, transfer molding, overmolding extrusion, blow molding, injection blow molding, thermoforming, top forming, press blowing, slot die extrusion, sheet die extrusion, foam extrusion, blown film extrusion, monotape and monofilament extrusion, powder coating and the like.

EXAMPLES

The following examples are illustrative of certain specific embodiments of this invention. Unless indicated to the contrary, all parts and percentages are by weight.

A series of SLEPs were manufactured in a solution process miniplant having two reactors, referred to herein as the "primary reactor" and "secondary reactor", connected in series. The primary reactor was used to continuously polymerize a feed mixture comprising an ethylene/1-octene/solvent mixture and hydrogen gas in the presence of a metallocene catalyst such as described in U.S. Pat. Nos. 5,272,236, 5,278,272 and 5,380,810. The partially reacted product of the primary reactor was fed continuously to the secondary reactor through the in-series connection between these reactors where that product was made to react with additional ethylene, again in the presence of the same metallocene catalyst, under reaction conditions which produce a polymer having a different $M_n$, generally a lower $M_n$, than the $M_n$, of the polymer produced under the primary reactor conditions. Such conditions generally included operating the secondary reactor at a higher temperature than the primary reactor. Polymer blends corresponding to Examples 1 to 4 were made by manipulating the reaction parameters of the primary and secondary reactors.

Example 1, for instance, is prepared by introducing into the primary reactor a mixture comprising ethylene ($C_2$), 1-octene ($C_8$) and hydrogen gas ($H_2$) at the following rates:

Primary Reactor Feed for Example 1

| Reactant | $C_2$ | $C_8$ | $H_2$ |
|---|---|---|---|
| Rate | 38.5 kg/hr. | 1993 kg/hr | 0.448 SCMH |

SCMH=standard cubic meters per hour (i.e., rate in cubic meters at standard temperature and pressure)

The primary reactor is maintained at a temperature of 70° C. and a product stream is transferred from the primary reactor to the secondary reactor at a rate of about 23.6 kg/hr. along with about 7.71 kg/hr ethylene, while maintaining the secondary reactor at a temperature of about 120° C. to produce a final product at a rate of about 36.5 kg/hr.

Comparative Examples C-1 to C-14 are examples of comparative SLEPs, C-15 is an example of a homogeneous polyethylene polymer, C-16 to C-19 are examples of comparative LLDPE polymers and C-20 and C-21 are examples of comparative VLDPE polymers.

Comparative Examples C-11 to C-20, are commercially available ethylene polymers. Engage® Polyolefin Elastomer and Affinity® Polyolefin Plastomer are both SLEPs and are available from The Dow Chemical Company. Dowlex® and Attane® are LLDPE and VLDPE resins, respectively, manufactured and sold by the Dow Chemical Company. Tafmer™ is a homogeneous linear polyethylene interpolymer supplied by Mitsui (Japan).

Additionally, Comparative Examples DR-A to DR-M were made by tumble mixing pairs of SLEPs and extruding the mixture. The extrudate was cooled and pelletized, and then reactive silane extrusion was carried out with those pellets. The characterization of the bi-component blend samples is given in Table 3 below.

Each polymer blend, when subjected to GPC analysis prior to crosslinking, produced a dual peak chromatogram. The results and their characterization are given in Tables 1 to 3 and 9 below.

TABLE 1

| | $I_2$ (g/ 10 min.) | Density (kg/m$^3$) | Overall $M_n$ | Overall $M_w$ | $M_w/M_n$ | $M_{n1}$ | $M_{n2}$ | $M_{n1}/M_{n2}$ | $A_1/(A_1 + A_2)$ |
|---|---|---|---|---|---|---|---|---|---|
| Examples of the Present Invention | | | | | | | | | |
| 1 | 0.94 | 868 | 25000 | 102000 | 4.08 | 182775 | 20984 | 8.71 | 0.30 |
| 2 | 0.95 | 882 | 29900 | 124000 | 4.15 | 211207 | 24809 | 8.51 | 0.29 |
| 3 | 4.4 | 881 | 6950 | 85000 | 12.23 | 99087 | 4570 | 21.68 | 0.51 |
| 4 | 9.2 | 882 | 13200 | 81000 | 6.14 | 175456 | 12478 | 14.06 | 0.27 |
| Comparative SLEP Examples | | | | | | | | | |
| C-1 | 2.2 | 918 | 32000 | 67500 | 2.11 | 485005 | 16154 | 30.02 | 0.07 |
| C-2 | 6.8 | 870 | 33500 | 69600 | 2.08 | 49311 | 14750 | 3.34 | 0.81 |
| C-3 | 1.0 | 918 | 36000 | 80400 | 2.23 | 529744 | 18177 | 29.14 | 0.06 |
| C-4 | 1.0 | 920 | 37000 | 73900 | 2.00 | 55891 | 16923 | 3.30 | 0.80 |
| C-5 | 1.0 | 900 | 45000 | 91100 | 2.02 | 65744 | 15280 | 4.30 | 0.95 |
| C-6 | 6.8 | 870 | 31600 | 65400 | 2.07 | 47272 | 15084 | 3.13 | 0.80 |
| C-7 | 1.9 | 868 | 44000 | 104000 | 2.36 | 51887 | 20303 | 2.56 | 0.87 |
| C-8 | 3.0 | 875 | 45000 | 84910 | 1.89 | 54939 | 12440 | 4.42 | 0.95 |
| C-9 | 13.5 | 870 | 26900 | 54800 | 2.04 | 42978 | 16593 | 2.59 | 0.67 |
| C-10 | 10.0 | 870 | 32500 | 68500 | 2.11 | 40002 | 7783 | 5.14 | 0.96 |

TABLE 2

| Comparative Examples | $I_2$ (g/ 10 min.) | Density (kg/m$^3$) | Overall $M_n$ | Overall $M_w$ | $M_w/M_n$ | $M_{n1}$ | $M_{n2}$ | $M_{n1}/M_{n2}$ | $A_1/(A_1 + A_2)$ |
|---|---|---|---|---|---|---|---|---|---|
| C-11 Engage ® CL 8001 | 0.5 | 868 | 65900 | 134000 | 2.00 | 100604 | 41231 | 2.44 | 0.7 |
| C-12 Engage ® CL 8002 | 1.0 | 870 | 54400 | 104300 | 1.9 | 65399 | 14296 | 4.57 | 0.96 |
| C-13 Engage ® EG 8200 | 5.0 | 875 | 35800 | 74800 | 2.1 | 57303 | 21103 | 2.72 | 0.74 |
| C-14 Engage ® SM 8400 | 23.0 | 870 | 23800 | 50400 | 2.1 | 63185 | 35669 | 2.63 | 0.64 |
| C-15 Tafmer ™ P0480 | 1.0 | 873 | 47300 | 90500 | 1.9 | 70303 | 21419 | 2.91 | 0.22 |
| C-16 Dowlex ® 2035 | 6.0 | 919 | 16500 | 62800 | 3.8 | 29518 | 4482 | 6.59 | 0.93 |
| C-17 Dowlex ® 2047 | 2.3 | 917 | 22500 | 78800 | 3.5 | 31438 | 2982 | 10.54 | 0.94 |
| C-18 Dowlex ® 2056 | 1.0 | 920 | 32000 | 110000 | 3.4 | 34178 | 2677 | 12.77 | 0.98 |
| C-19 Dowlex ® NG5056 | 1.1 | 919 | 35000 | 121000 | 3.5 | 39673 | 4729 | 8.39 | 0.97 |
| C-20 Attane ® 4001E | 1.0 | 912 | 30000 | 98900 | 3.3 | 32625 | 2893 | 11.28 | 0.98 |
| C-21 Dow VLDPE | 7.0 | 910 | 19400 | 64100 | 3.3 | 35101 | 17113 | 2.05 | 0.36 |

TABLE 3

| Compar. Examples | SLEP #1 | SLEP #2 | % #1 | % #2 | $I_2$ (g/ 10 min.) | Overall $M_n$ | Overall $M_w$ | $M_w/M_n$ | $M_{n1}$ | $M_{n2}$ | $M_{n1}/M_{n2}$ | $A_1/(A_1 + A_2)$ |
|---|---|---|---|---|---|---|---|---|---|---|---|---|
| DR-A | C-8 | C-13 | 50 | 50 | 4.2 | 38900 | 74850 | 1.92 | 54711 | 18992 | 2.88 | 0.82 |
| DR-B | C-12 | C-14 | 10 | 90 | 18.9 | 25800 | 54000 | 2.09 | 40122 | 22431 | 1.79 | 0.36 |
| DR-C | C-8 | C-14 | 50 | 50 | 8.9 | 29300 | 61700 | 2.11 | 40949 | 11643 | 3.52 | 0.87 |
| DR-D | C-8 | C-10 | 10 | 90 | 8.8 | 32900 | 62900 | 1.91 | 43299 | 12979 | 3.34 | 0.89 |
| DR-E | C-11 | C-13 | 50 | 50 | 1.4 | 47500 | 10200 | 2.15 | 55117 | 11431 | 4.82 | 0.98 |
| DR-F | C-12 | C-10 | 50 | 50 | 2.5 | 41600 | 94600 | 2.27 | 54568 | 11938 | 4.57 | 0.92 |
| DR-G | C-12 | C-13 | 90 | 10 | 0.94 | 54300 | 11100 | 2.04 | 78871 | 32654 | 2.42 | 0.74 |
| DR-H | C-8 | C-10 | 90 | 10 | 3.7 | 38800 | 75700 | 1.95 | 54275 | 17978 | 3.02 | 0.84 |
| DR-I | C-12 | C-13 | 10 | 90 | 4.2 | 36700 | 75200 | 2.05 | 49679 | 12894 | 3.85 | 0.91 |
| DR-J | C-12 | C-14 | 90 | 10 | 1.0 | 49800 | 10700 | 2.15 | 77543 | 31134 | 2.49 | 0.69 |
| DR-K | C-11 | C-14 | 50 | 50 | 3.3 | 34100 | 85600 | 2.51 | 47163 | 15971 | 2.95 | 0.84 |
| DR-L | C-11 | C-10 | 90 | 10 | 0.7 | 58900 | 12500 | 2.12 | 95595 | 41750 | 2.29 | 0.61 |
| DR-M | C-11 | C-10 | 10 | 90 | 7.1 | 33000 | 68100 | 2.06 | 47882 | 25379 | 1.89 | 0.55 |

Figure 5:
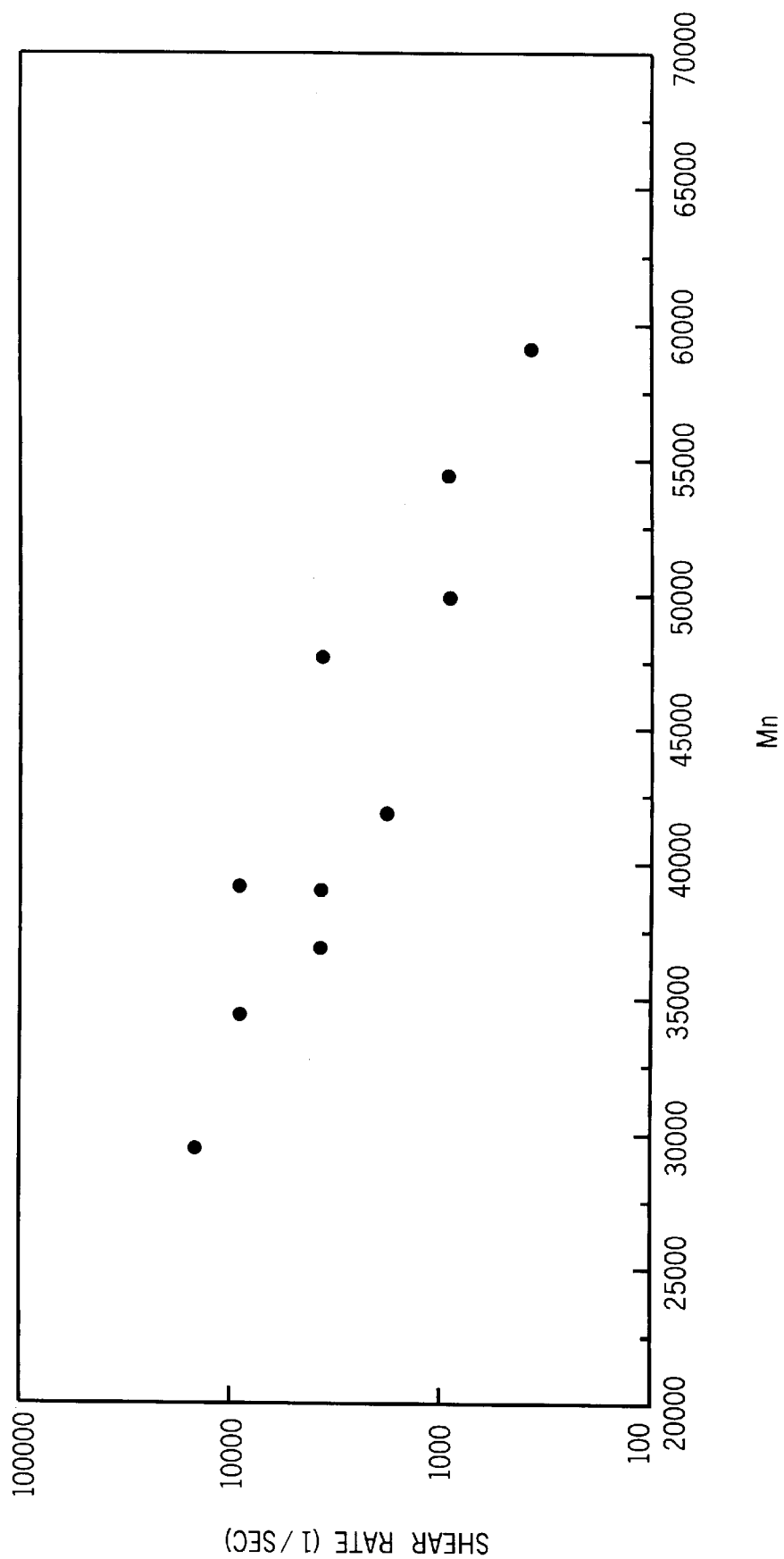
FIG. 5 represents the shear rate at which the onset of surface melt fracture occurs as a function of overall $M_n$ for the polymer compositions of Table 4.

The data from Table 4 show that the processability of a crosslinkable polyethylene composition relates to the overall number average moment of its molecular weight $M_n$. The shear rate at which the onset of surface melt fracture occurs as a function of overall $M_n$ for a series of substantially linear ethylene polymer compositions is tabulated in Table 4. FIG. 5 illustrates the dependency of the onset of surface melt fracture on overall $M_n$ for the series of substantially linear ethylene polymer ("SLEP") compositions shown in Table 4.

TABLE 4

Onset of Surface Melt Fracture as a Function of $M_n$
(Capillary rheology: Shear rate-viscosity curves were measured over the range 1–22,000 sec$^{-1}$ on a Rheograph 2000 instrument at 220° C. using a 30/1 mm capillary die.)

| Comparative Examples | Overall $M_n$ | Onset of surface melt fracture (shear rate-(sec$^{-1}$)) Determined by visual inspection |
|---|---|---|
| DR-A | 38900 | 9000 |
| DR-C | 29300 | 14400 |
| DR-E | 47500 | 3600 |
| DR-F | 41600 | 1800 |
| DR-G | 54300 | 900 |
| DR-H | 38800 | 3600 |
| DR-I | 36700 | 3600 |
| DR-J | 49800 | 900 |
| DR-K | 34100 | 9000 |
| DR-L | 58900 | 360 |

Figure 6:
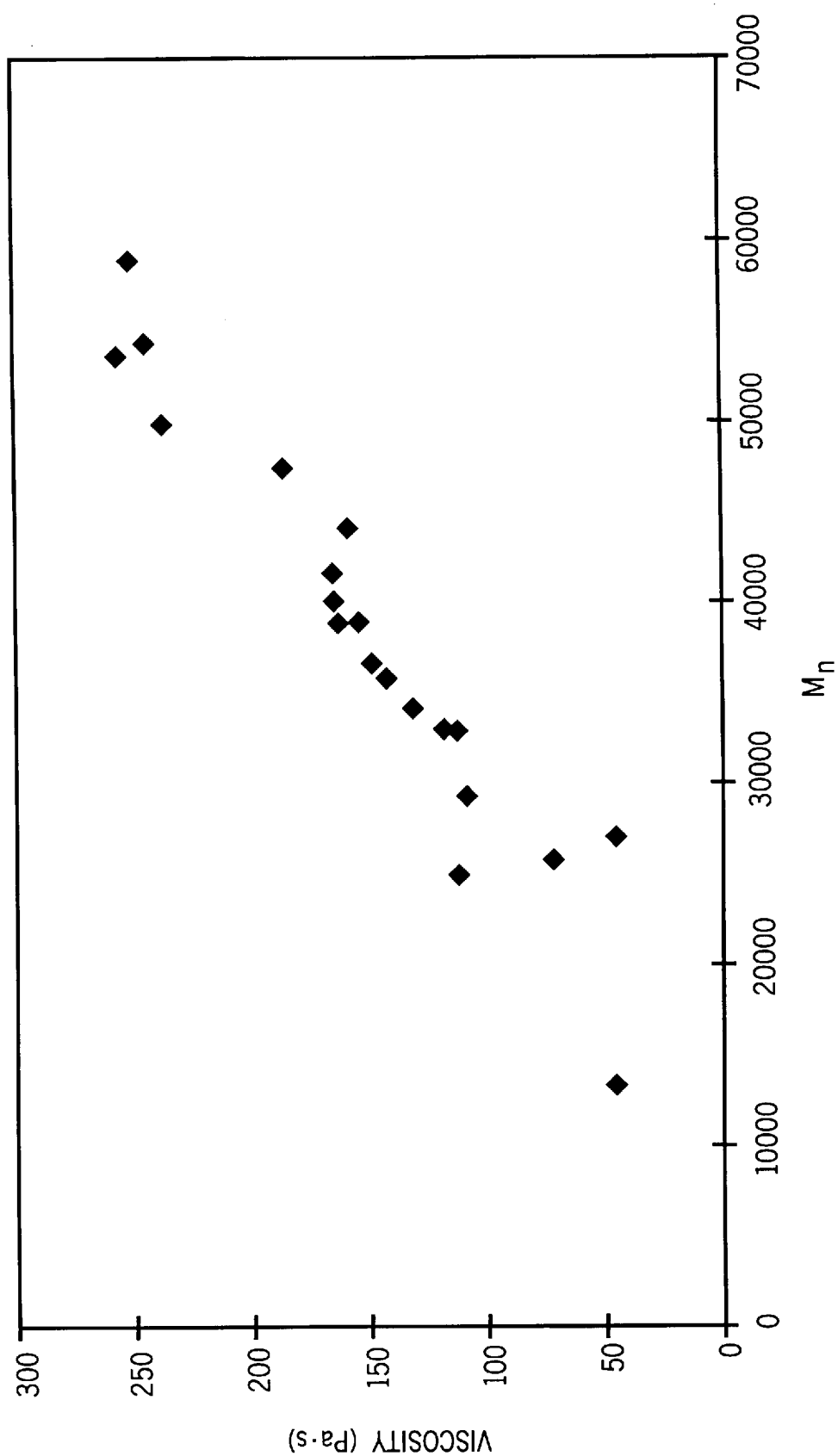
FIG. 6 shows melt viscosity as a function of overall $M_n$ for the compositions of Table 5.

Table 5 tabulates the dependency of the melt viscosity measured at 220° C. at 1800 sec$^{-1}$ of prior art polymer and inventive samples on overall $M_n$. FIG. 6 illustrates this dependency and clearly demonstrates that melt viscosity is essentially dependent on overall $M_n$.

TABLE 5

Polymer Melt Viscosity in Pa · s as a Function of $M_n$
(Capillary rheology: Shear rate-viscosity curves were measured over the range 1–22,000 sec$^{-1}$ on a Rheograph 2000 instrument at 220° C. using a 30/1 mm capillary die.)

| | Overall $M_n$ | Sample viscosity at 1800 sec$^{-1}$ and 220° C. |
|---|---|---|
| Comparative Examples | | |
| DR-A | 38900 | 153 |
| DR-B | 25800 | 72 |
| DR-C | 29300 | 108 |
| DR-D | 32900 | 113 |
| DR-E | 47500 | 185 |
| DR-F | 41600 | 163 |
| DR-G | 54300 | 244 |
| DR-H | 38800 | 162 |
| DR-I | 36700 | 148 |
| DR-J | 49800 | 237 |
| DR-K | 34000 | 132 |
| DR-L | 58900 | 251 |
| DR-M | 33000 | 118 |
| C-7 | 44000 | 158 |
| C-9 | 26900 | 44 |
| C-12 | 54400 | 256 |
| C-13 | 35800 | 143 |
| Examples of the Present Invention | | |
| 1 | 25000 | 112 |
| 4 | 13200 | 44 |

Peroxide Cured Examples

The compositions listed in Table 6 were compounded into crosslinkable formulations according to the Recipe 1 by the following procedure; 85% by weight of the polymer was added to a two litre Farrel 89M5030 internal mixer and mixed until the stock temperature reached 80° C. (approximately 2 minutes). A total mix batch weight of 1335 grams was used. The remaining ingredients were then added and mixed for a further period until the total cycle time from the start reached 5 minutes, after which the batch was discharged from the mixer. The discharge temperature was typically about 100°–110° C. The mix was then milled on a Farrel 6"×13" two roll mill for two minutes at 60° C. using a friction ratio of 1.5 to 1 between rear and front roll speeds and a nip of approximately 0.5 mm., before slabbing off a 4 nmm. sheet which was allowed to rest for two hours at 20° C. before testing.

| Recipe 1 | |
|---|---|
| Ingredient | Parts per hundred of rubber (phr) |
| Polymer | 100.00 |
| Perkadox 14/40 K* | 2.00 |
| Rhenofit TAC/S** | 0.50 |
| Vulkanox HS/LG*** | 1.00 |
| Total | 103.50 |

*Perkadox 14/40 K is a 40% active Bis(tert-butylperoxyisopropyl)benzene peroxide, supplied by Akzo Chemicals International B.V., Amersfoort, The Netherlands.
**Rhenofit TAC/S is a 70% Triallylcyanurate/30% Silica coagent supplied by Rhein Chemie Rheinau GmbH, Mannheim, Germany.
***Vulkanox HS/LG is a polymerised 2,2,4-trimethyl-1,2-dihydro-quinoline antioxidant supplied by Bayer AG, Leverkusen, Germany.

The time to optimum cure for the peroxide crosslinkable formulations was determined at 160° C. using a Zwick Oscillating Disk Rheometer 4308 (1° rotor angle and a frequency of 100 min$^{-1}$). The time to optimum cure, expressed as $T_{90}$, was calculated directly by the Zwick ODR software model 7049 3-2, version 06.07.89/07.07.89 according to the procedure described in DIN 53529/T2.

Figure 7:
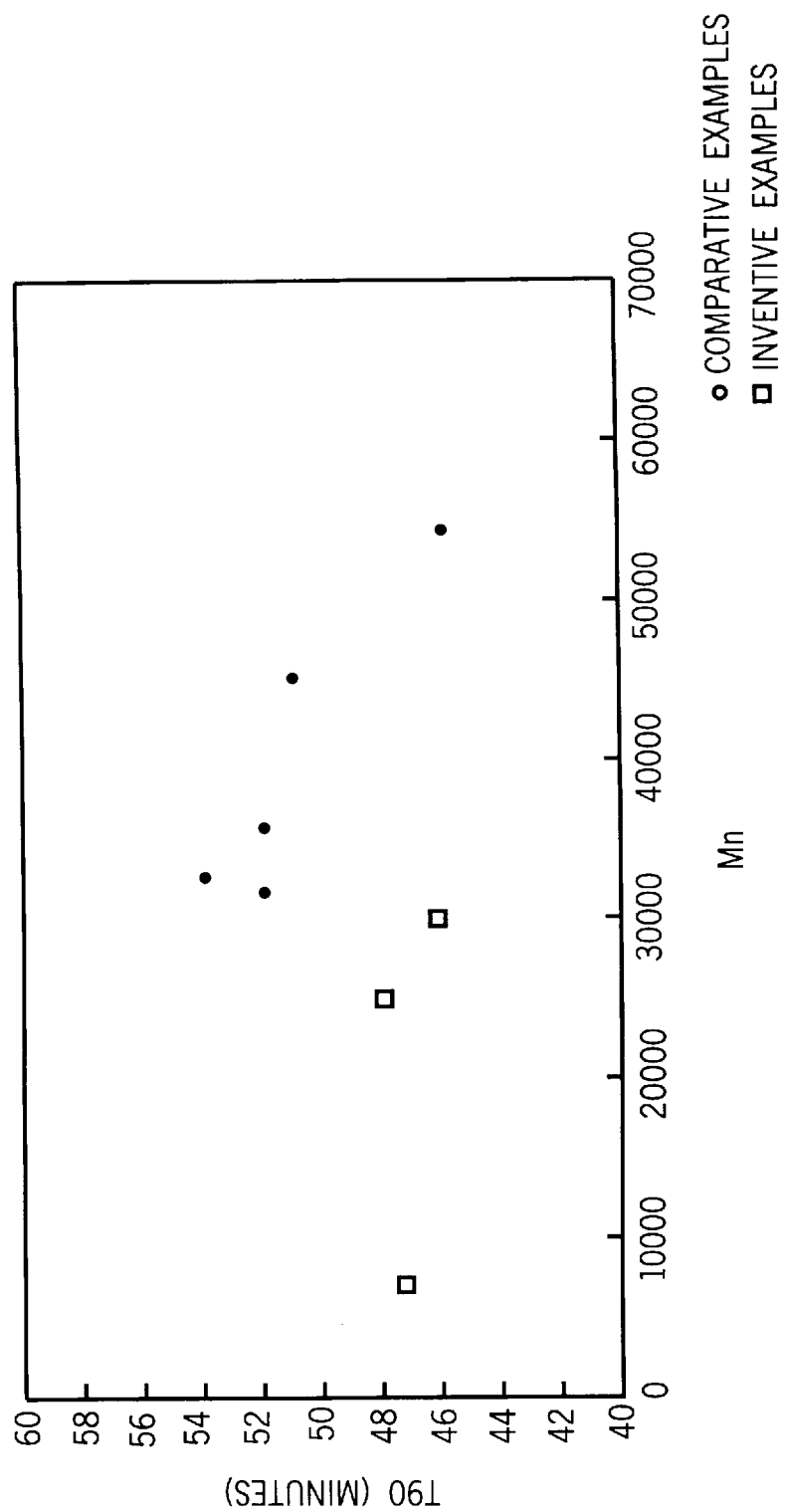
FIG. 7 shows the variation of cure time for the series of peroxide crosslinkable compositions of Table 6 as a function of overall $M_n$.

Table 6 tabulates the dependency of time to optimum cure as determined by the oscillating disk rheometer using the method described above as a function of overall $M_n$ for a series of peroxide crosslinkable SLEP compositions as described in Recipe 1. The samples are identified by reference to the raw polymer from which the crosslinkable compositions were made. FIG. 7 illustrates this dependency and clearly shows the higher than expected cure speed of the inventive compositions relative to their overall number average molecular weights. For example, Example 2 cures in 46.2 minutes at 160° C. versus an expected time of approximately 54 minutes based on its number average molecular weight. Similarly, Example 3 cures in 47.3 minutes at the same temperature versus an expected cure time of more than 60 minutes, and Example 1 cures in 48 minutes versus an expected time of about 56 minutes at 160° C. The expected cure times are estimated based on an extrapolation of the data for the prior art compositions, i.e. based on extrapolation of cure time versus overall $M_n$ relations of prior art compositions.

TABLE 6

Peroxide Cured SLEP Compositions

| | Overall $M_n$ | Time to Optimum Cure/ Minutes at 160° C., $T_{90}$ |
|---|---|---|
| Comparative Examples | | |
| C-6 | 31600 | 52 |
| C-8 | 45000 | 51 |

TABLE 6-continued

Peroxide Cured SLEP Compositions

|  | Overall $M_n$ | Time to Optimum Cure/ Minutes at 160° C., $T_{90}$ |
|---|---|---|
| C-10 | 32500 | 54 |
| C-12 | 54400 | 46 |
| C-13 | 35800 | 52 |
| Examples of the Present Invention | | |
| 1 | 25000 | 48 |
| 2 | 29900 | 46.2 |
| 3 | 6950 | 47.3 |

Silane Crosslinked Examples

A series of polyethylene resins and substantially linear ethylene polymers were reacted with a grafting package consisting of 1.519 wt % vinyl trimethoxy silane, 0.075 wt % dicumyl peroxide as grafting initiator, and 0.025 wt % dibutyl tin dilaurate as crosslinking catalyst by taking a mixture of 10cm$^3$ of Dynasylan Silfin 12 consisting of 92.5% of vinyl trimethoxy silane and 7.5% of dicumyl peroxide, and 6.67cm$^3$ of Dynasylan Silfin 21 consisting of 96.2% of vinyl trimethoxy silane and 3.8% of dibutyl tin laurate (Dynasylan Silfin 12 and Dynasylan Silfin 21 are both commercial products available from Hüls), adding the said mixture to 985 grams of the polymer sample in a closed drum and tumble mixing the contents for one hour and then feeding the prepared mixtures to a single screw 16 mm. extruder of L/D=28/1 and a 2.5:1 compression ratio screw fitted with a "Cavity Transfer Mixer" feeding a strand die, said equipment manufactured by Extrusion Centre, Plasticisers Engineering Ltd.(UK). It is also possible to meter the premixed silane/peroxide/catalyst mixture directly to the extruder hopper throat, although this method was not used for the purposes of the study. Extruder rpms were such that the residence time was between 3 and 7 mins and the resin melt temperature was around 220° C. Using this procedure all resins were grafted to an equal extent. The extruded strands were cut by an air knife using a blast of dry compressed air to avoid premature curing from contact with moisture. Compression molded plaques of the extrudates were produced by taking the dry granules and placing them in a mold of nominal dimensions 160 mm.×160 mm.×2 mm. thick at a temperature of 180° C., heating the mold to 190° C., pressurising the mold to 15 bars for 6 minutes, then increasing the pressure to 150 bars for 3 minutes and then allowing the temperature to decrease to 20° C. at a cooling rate of 15° C./minute, using a hydraulic press, type Platen Presse 200 manufactured by Collins. The molded plaques were then cured at 23° C. in air containing 80% relative humidity or were cured by placing them in a thermostated water bath heated to 60° C.

The rate of crosslinking was followed by periodically removing the plaque and taking a dog-bone shaped sample for hot set analysis. This analysis involved placing the dog-bone of ASTM dimensions in an oven at 200° C. and attaching weights equivalent to a stress of 20N/cm$^2$ to the sample. The resulting elongation of the sample is recorded. As the state of cure of the sample increases, the measured elongation decreases. The rate of the elongation decrease is therefore a measure of the rate of cure. The method is described fully in Publication 811-2-1 of the International Electrotechnical Commision Standard published 1986 herein incorporated by reference. This industry standard considers that a satisfactory state of cure has been achieved if the hot set (elongation at specified temperature) of the sample does not exceed 175% after 15 minutes under a load of 20 Ncm$^{-2}$. In order to determine the cure time corresponding to this hot set value of 175% after 15 minutes under a load of 20 Ncm$^{-2}$ at 200° C., the hot set is measured using a different dog-bone sample at each of a number of cure times and plotting the resulting hot set versus time on log log graph paper. At very short cure times the hot set value may be very high and the sample may break before 15 minutes has elapsed. In this case the elongation under load is measured just before the sample breaks. A best line is drawn through the data points and the intersection with the 175% hot set value gives the target cure time for the purposes of the evaluation.

Figure 8:
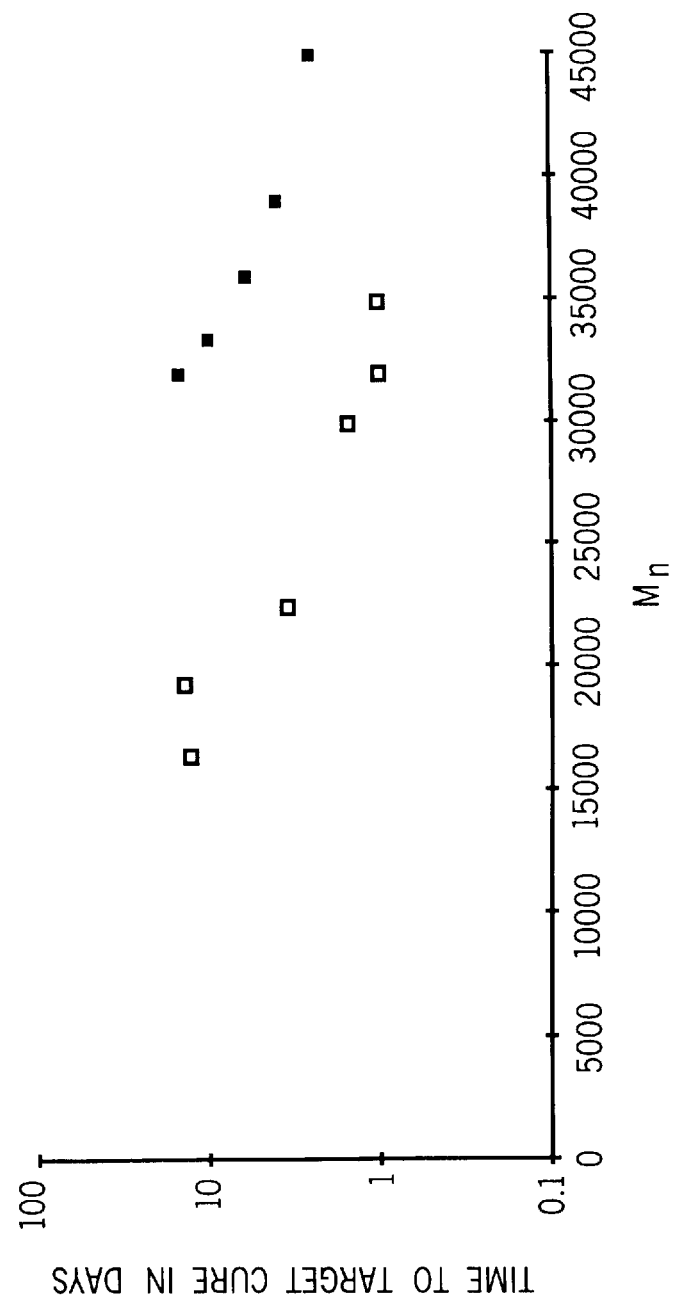
FIG. 8 shows the variation of time to 175% hot set target cure for the series of air cured silane crosslinkable compositions given in Table 7 as a function of overall $M_n$.

Table 7 tabulates the dependency of time for target cure for a series of prior art LLDPE's (including VLDPE's and ULDPE's), and comparative SLEP's as a function of number average molecular weight when crosslinked in air containing 80% relative humidity at 23° C. according to the procedure given above. FIG. 8 illustrates this dependency and clearly shows that the target cure time increases dramatically as $M_n$ becomes less for both LLDPE and SLEP. Similar curves may be obtained for other classes of polyolefin.

TABLE 7

Time to Target Cure as a Function of $M_n$ for Air Cured Silane Crosslinkable Compositions based on SLEP and Prior Art LLDPE

| Comparative Example | Comments | $M_n$ | Cure Time/Days |
|---|---|---|---|
| C-1 | Comparative SLEP | 32000 | 15.0 |
| C-2 | Comparative SLEP | 33500 | 10.0 |
| C-3 | Comparative SLEP | 36000 | 6.0 |
| C-4 | Comparative SLEP | 37000 | 4.0 |
| C-5 | Comparative SLEP | 45000 | 2.5 |
| C-16 | Comparative LLDPE | 16500 | 14.0 |
| C-17 | Comparative LLDPE | 22500 | 3.5 |
| C-18 | Comparative LLDPE | 32000 | 1.0 |
| C-19 | Comparative LLDPE | 35000 | 1.0 |
| C-20 | Comparative VLDPE | 30000 | 1.5 |
| C-21 | Comparative VLDPE | 19400 | 13.0 |

A further series of silane crosslinkable compositions were prepared according to the methods described above, with the difference that the crosslinkable compositions were crosslinked by leaving the molded plaques in water maintained at 60° C. The series included compositions based on substantially linear ethylene polymers, blends of substantially linear ethylene polymers and conventional homogeneous polyethylene.

Table 8 tabulates the dependency of time to target cure for this series of polymer compositions as a function of $M_n$ when silane crosslinked using water at 60° C. according to the procedure given above.

TABLE 8

Time to Target Cure for Silane Comparative Crosslikable Compositions of Homogeneous Polyethylene and Substantially Linear Ethylene Polymer Cured in a Water Bath at 60° C., and Inventive Examples

| | Comments | $M_n$ | Cure Time/ Hours |
|---|---|---|---|
| Comparative Examples | | | |
| DR-A | Comparative SLEP Physical Blend | 38900 | 5.57 |
| DR-B | Comparative SLEP Physical Blend | 25800 | 31.35 |
| DR-C | Comparative SLEP Physical Blend | 29300 | 9.82 |
| DR-D | Comparative SLEP Physical Blend | 32900 | 9.73 |
| DR-E | Comparative SLEP Physical Blend | 47500 | 2.40 |
| DR-F | Comparative SLEP Physical Blend | 41600 | 3.67 |
| DR-G | Comparative SLEP Physical Blend | 54300 | 1.55 |
| DR-H | Comparative SLEP Physical Blend | 38800 | 4.69 |
| DR-I | Comparative SLEP Physical Blend | 36700 | 4.83 |
| DR-J | Comparative SLEP Physical Blend | 49800 | 2.32 |
| DR-K | Comparative SLEP Physical Blend | 34100 | 5.80 |
| DR-L | Comparative SLEP Physical Blend | 58900 | 1.89 |
| DR-M | Comparative SLEP Physical Blend | 33000 | 8.02 |
| C-7 | Comparative SLEP | 44000 | 4.96 |
| C-9 | Comparative SLEP | 26900 | 19.60 |
| C-11 | Comparative SLEP | 65900 | 1.19 |
| C-12 | Comparative SLEP | 54400 | 1.60 |
| C-13 | Comparative SLEP | 35800 | 6.21 |
| C-14 | Comparative SLEP | 23800 | 104.30 |
| C-15 | Comparative Homogeneous PE | 47300 | 2.29 |
| Examples of the Present Invention | | | |
| 1 | Inventive Composition | 25000 | 2.79 |
| 2 | Inventive Composition | 29900 | 3.67 |
| 3 | Inventive Composition | 6950 | 17.43 |
| 4 | Inventive Composition | 13200 | 31.16 |

Figure 9:
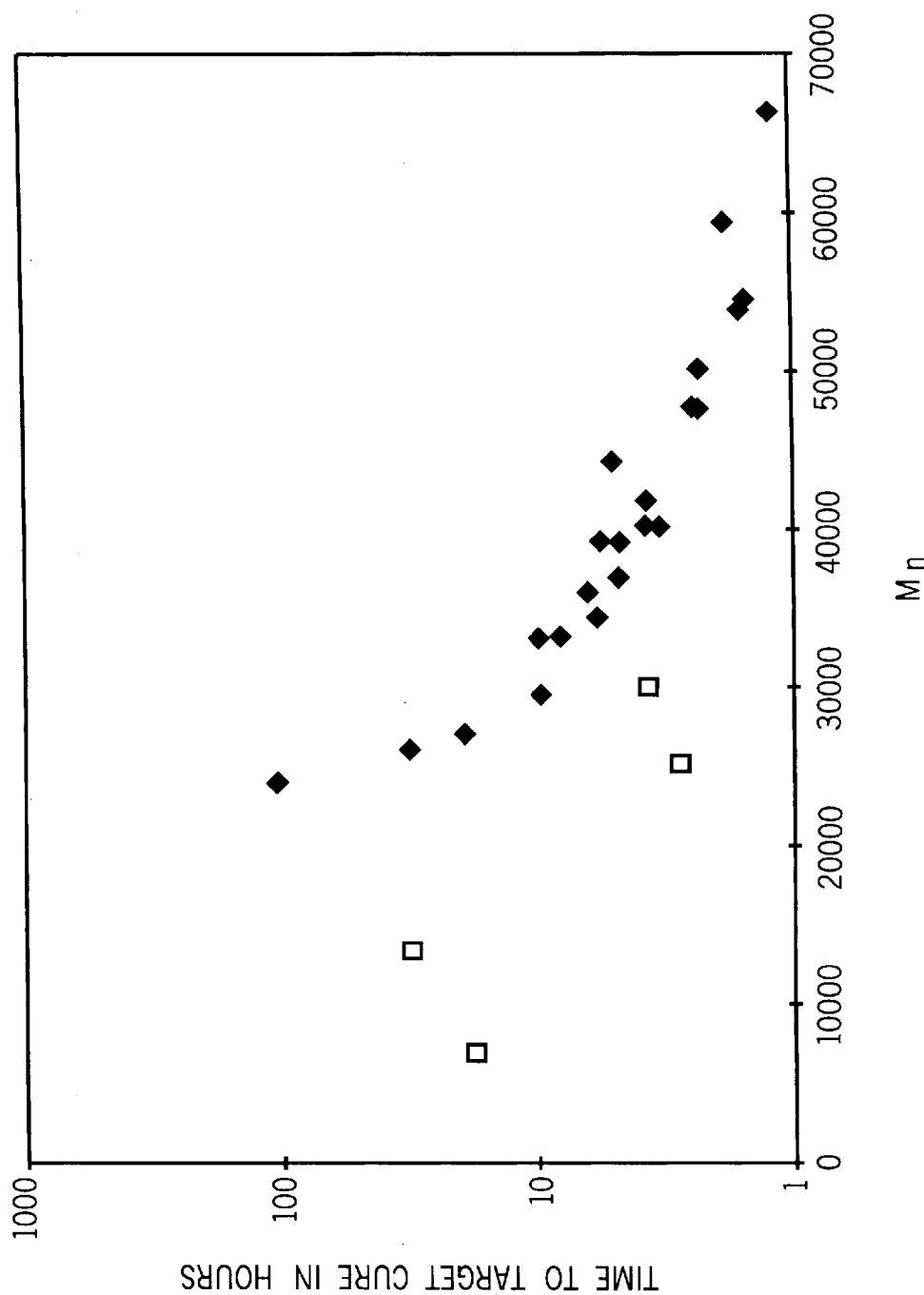
FIG. 9 shows the influence of $M_n$ on time to 175% hot set target cure for a series of silane crosslinkable polyethylene compositions when cured in water at 60° C. as shown in Table 8. The datapoints representing the present invention are pointed out with arrows.

Whereas FIG. 5 and FIG. 6 clearly demonstrate that processability is improved as the $M_n$ of polyethylene is reduced, FIG. 8 and FIG. 9 clearly demonstrate that the time to target cure for the silane crosslinked compositions according to the prior art increases dramatically as the primary $M_n$ of the polyethylene sample is decreased. FIG. 9 also clearly demonstrates that the formulations proposed by Wong et al follow the same pattern as would be expected from their $M_n$ value.

Table 8 also tabulates the dependency of cure time for the inventive samples of this disclosure as a function of number average molecular weight, and hence processability, compared with the cure time of corresponding formulations of the prior art. FIG. 9 shows the inventive examples as open boxes. The scale of the "Time to Target Cure" axis is logarithmic so as to more clearly illustrate the surprising and significant improvement in cure rate performance which may be obtained without loss of processabilty by application of this invention. For example the inventive composition based on Example 1 cured in 2.79 hours versus 31.35 hours for the comparative example DR-B and 104.3 hours for the comparative example C-14, of similar number average molecular weights, Example 2 cured in water at 60° C. in 3.67 hours versus a cure time of 9.82 hours under the same conditions for comparative composition DR-C of similar number average molecular weight. Example 3 cured under the same conditions in 17.43 hours versus an expected cure time in excess of 1000 hours, and Example 4 cured in 31.16 hours versus an expected time again in excess of 1000 hours.

Inventive composition Example 1, which cured in 2.79 hours may be compared with comparative compositions DR-F and DR-E which cured in 3.67 and 2.40 hours respectively. Example 1 has a polymer melt viscosity at 1800 sec$^{-1}$ at 220° C. of 112 Pa·s versus 163 Pa.s for DR-F and 185 Pa·s for DR-E. Likewise, the processability of inventive composition Example 4, which cored in 31.16 hours may be compared with the processability of comparative composition DR-B which also cured in 31.35 hours. The polymer melt viscosity at 1800 sec$^{-1}$ at 220° C. for Example 4 was 44 Pa·s versus 72 Pa·s for DR-B, and hence considerably better for the inventive composition.

Table 9 shows a summary of $M_{n1}/M_{n2}$ and $A_1/(A_1+A_2)$ for the comparative and inventive compositions. FIG. 10 depicts the same data graphically and illustrates the combinations of $M_{n1}/M_{n2}$ and $A_1/(A_1+A_2)$ parameters which provide the benefits of the invention.

TABLE 9

Summary of Data Shown in FIG. 11

| | $M_{n1}/M_{n2}$ | $A_1/A_1 + A_2)$ |
|---|---|---|
| Comparative Examples | | |
| DR-A | 2.88 | 0.82 |
| DR-B | 1.79 | 0.36 |
| DR-C | 3.52 | 0.87 |
| DR-D | 3.34 | 0.89 |
| DR-E | 4.82 | 0.98 |
| DR-F | 4.57 | 0.92 |
| DR-G | 2.42 | 0.74 |
| DR-H | 3.02 | 0.84 |
| DR-I | 3.85 | 0.91 |
| DR-J | 2.49 | 0.69 |
| DR-K | 2.95 | 0.84 |
| DR-L | 2.29 | 0.61 |
| DR-M | 1.89 | 0.55 |
| C-7 | 2.56 | 0.87 |
| C-13 | 2.72 | 0.74 |
| Examples of the Present Invention | | |
| 1 | 8.71 | 0.30 |
| 2 | 8.51 | 0.29 |
| 3 | 21.68 | 0.51 |
| 4 | 14.06 | 0.27 |

Although the invention has been described in considerable detail through the preceding specific embodiments, it is to be understood that these embodiments are for purposes of illustration only. Many variations and modifications can be made by one skilled in the art of without departing from the spirit and scope of this invention.

What is claimed is:

1. A bimodal polyolefin composition comprising two or more ethylene polymer components and a crosslinking agent, activator, promoter or accelerator, said composition satisfying the following conditions:

$M_{n1}/M_{n2} > 7$, $M_{n2} > 3000$ and $0.7 \geq (A_1/(A_1+A_2)) \geq 0.15$, wherein $A_1$, $A_2$, $M_{n1}$, and $M_{n2}$ are derived from the molecular weight distribution of the composition obtained via gel permeation chromatography (GPC) by deconvoluting the relative response (RR) as function of the molecular weight (MW) to fit RR and MW to the following function which is a weighted sum of two log normal distribution functions:

$$RR = \frac{A_1}{\sigma_1 \sqrt{2\pi}} \exp\left(-\left(\frac{\log(MW) - \mu_1}{\sigma_1 \sqrt{2}}\right)^2\right) +$$

$$\frac{A_2}{\sigma_2 \sqrt{2\pi}} \exp\left(-\left(\frac{\log(MW) - \mu_2}{\sigma_2 \sqrt{2}}\right)^2\right)$$

using a nonlinear regression technique to obtain values for $A_1$, $A_2$, $\mu_1$, $\mu_2$, $\sigma_1$, and $\sigma_2$, wherein MW is the GPC molecular weight value, RR is the relative response, which for an individual $RR/M_w$ data set is $$RR[i] = \frac{\text{Normalized Height }[i]}{\log(MW[i-1]) - \log(MW[i])}$$

in which the Normalized Height [i] is the GPC output for the corresponding MW [i];

$\mu_1$ and $\sigma_1^2$ represent the mean and standard deviation of the first log normal distribution;

$\mu_2$ and $\sigma_2^2$ represent the mean and standard deviation of the second log normal distribution;

$A_1 + A_2 = 1$ and $0 < A_1 < 1$;

$M_{n1} = 10^{\mu_1} \exp(-0.5(\ln(10) \times \sigma_1)^2)$ and $M_{n2} = 10^{\mu_2} \exp(-0.5(\ln(10) \times \sigma_2)^2)$, the composition having an overall density less than 0.907 g/cm³.

2. The composition of claim 1 having an overall density in the range from 0.850 g/cm³ to 0.900 g/cm³.

3. The composition of claim 1 wherein $M_{n2}$ is greater than 4,000.

4. The composition of claim 1 wherein $A_1/(A_1+A_2)$ is less than or equal to 0.65.

5. The composition of claim 1 wherein $A_1/(A_1+A_2)$ is greater than or equal to 0.2.

6. The composition of claim 1 comprising not more than two ethylene polymer components.

7. The composition of claim 6 wherein the two ethylene polymer components are substantially linear ethylene polymers wherein the bulk polymers have an average of about 0.01 to about 3 chain branches/1000 carbon atoms.

8. The composition of claim 7 wherein the substantially linear ethylene polymers comprise ethylene and an α-olefin comonomer having from 4 to 10 carbon atoms.

9. The composition of claim 8 wherein each of the substantially linear ethylene polymers has a molecular weight distribution $(M_w/M_n)$ defined by the formula:

$M_w/M_n \leq (I_{10}/I_2) - 4.63$ in which the melt flow ratio $(I_{10}/I_2)$ is greater than or equal to 5.63.

10. The composition of claim 9 having a density in the range of from 0.850 to 0.900 g/cm³.

11. The composition of claim 1 wherein the crosslinking agent is an unsaturated silane grafted onto the composition.

12. The composition of claim 11 wherein the unsaturated silane is represented by the formula:

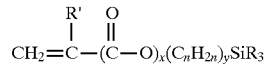

wherein R' represents a hydrogen atom or methyl group; x and y are 0 or 1 with the proviso that when x is 1, y equals 1; n is an integer from 1 to 12 inclusive; and each R independently represents a hydrolyzable organic group with the proviso that not more than one of the three R groups is an alkyl.

13. The composition of claim 12 wherein n is an integer from 1 to 4 and R is an alkoxy group having from 1 to 12 carbon atoms, aryloxy group, araloxy, aliphatic acyloxy group having from 1 to 12 carbon atoms, oximo or substituted amino groups, or a lower alkyl group having 1 to 6 carbon atoms inclusive.

14. A composition according to claim 1 wherein $M_{n2}$ is greater than 4,000 and $A_1/(A_1+A_2)$ is greater than or equal to 0.2 and less than or equal to 0.65.

15. An article comprising a crosslinked polyolefin composition obtainable by curing the composition of claim 1.

16. An article comprising a crosslinked polyolefin composition obtainable by curing the composition of claim 14.

17. A process for making the polyolefin composition according to claim 1 comprising:

(a) preparing a first olefin polymer and a second olefin polymer;

(b) blending the first and second olefin polymers such that the first and second olefin polymers are homogeneously mixed to provide a polyolefin composition satisfying the following conditions:

$M_{n1}/M_{n2} > 7$, $M_{n2} > 3000$ and $0.7 \geq (A_1/(A_1+A_2)) \geq 0.15$, wherein $M_{n1}$, $M_{n2}$, $A_1$ and $A_2$ are derived from the molecular weight distribution of the composition obtained via gel permeation chromatography (GPC) by deconvoluting the relative response (RR) as function of the molecular weight (MW) to fit RR and MW to the following function which is a weighted sum of two log normal distribution functions:

$$RR = \frac{A_1}{\sigma_1 \sqrt{2\pi}} \exp\left(-\left(\frac{\log(MW) - \mu_1}{\sigma_1 \sqrt{2}}\right)^2\right) +$$

$$\frac{A_2}{\sigma_2 \sqrt{2\pi}} \exp\left(-\left(\frac{\log(MW) - \mu_2}{\sigma_2 \sqrt{2}}\right)^2\right)$$

using a nonlinear regression technique to obtain values for $A_1$, $A_2$, $\mu_1$, $\mu_2$, $\sigma_1$, and $\sigma_2$, wherein MW is the GPC molecular weight value, RR is the relative response, which for an individual $RR/M_w$ data set is RR[i]=Normalized Height[i]/log (MW[i−1])−log (MW[i]))

in which the Normalized Heigh [i] is the GPC output for the corresponding MW[i];

$\mu_1$ and $\sigma_1^2$ represent the mean and standard deviation of the first log normal distribution;

$\mu_2$ and $\sigma_2^2$ represent the mean and standard deviation of the second log normal distribution;

$A_1+A_2=1$ and $0<A_1<1$;

$M_{n1}=10^{\mu_1} \exp(-0.5(\ln(10)\times\sigma_1)^2)$ and $M_{n2}=10^{\mu_1} \exp(-0.5(\ln(10)\times\sigma_2)^2)$, and the composition having an overall density less than 0.907 g/cm³; and c) adding a crosslinking agent to the composition.

18. The process of claim 17 wherein the first olefin polymer is an ethylene polymer which is prepared in a first reactor, and the second olefin polymer is an ethylene polymer which is prepared in a second reactor.

19. The process of claim 18 wherein the first ethylene polymer prepared in the first reactor is transferred to the second reactor where the second ethylene polymer is prepared in the presence of the first ethylene polymer.

20. The process of claim 18 carried out in the slurry phase, solution phase, or gas phase.

21. A process for crosslinking the crosslinkable composition of claim 1 comprising subjecting the crosslinkable composition to crosslinking conditions.

22. The process of claim 21 wherein the crosslinkable composition is subjected to crosslinking conditions during or subsequent to a step of processing the composition into an article.

* * * * *